United States Patent
Ledwell et al.

(10) Patent No.: US 10,207,941 B2
(45) Date of Patent: Feb. 19, 2019

(54) CONTROL SYSTEM FOR NITROGEN AND PHOSPHORUS REMOVAL

(71) Applicant: ENVIRONMENTAL OPERATING SOLUTIONS, INC., Bourne, MA (US)

(72) Inventors: Samuel Augustine Ledwell, North Falmouth, MA (US); Albert Paul Togna, Allentown, NJ (US)

(73) Assignee: Environmental Operating Solutions, Inc., Bourne, MA (US)

( * ) Notice: Subject to any disclaimer, the term of this patent is extended or adjusted under 35 U.S.C. 154(b) by 475 days.

(21) Appl. No.: 14/873,782

(22) Filed: Oct. 2, 2015

(65) Prior Publication Data

US 2016/0272519 A1 Sep. 22, 2016

Related U.S. Application Data

(60) Provisional application No. 62/133,594, filed on Mar. 16, 2015.

(51) Int. Cl.
| | | |
|---|---|---|
| *C02F 3/00* | (2006.01) | |
| *C02F 3/30* | (2006.01) | |
| *C02F 101/10* | (2006.01) | |
| *C02F 101/16* | (2006.01) | |

(52) U.S. Cl.
CPC ............. *C02F 3/006* (2013.01); *C02F 3/308* (2013.01); *C02F 2101/105* (2013.01); *C02F 2101/16* (2013.01); *C02F 2209/005* (2013.01); *C02F 2209/006* (2013.01); *C02F 2209/04* (2013.01); *C02F 2209/06* (2013.01); *C02F 2209/07* (2013.01); *C02F 2209/08* (2013.01); *C02F 2209/15* (2013.01); *C02F 2209/18* (2013.01); *C02F 2209/20* (2013.01); *C02F 2209/21* (2013.01); *C02F 2209/22* (2013.01); *C02F 2209/34* (2013.01); *C02F 2209/40* (2013.01)

(58) Field of Classification Search
CPC ................ C02F 3/308; C02F 2101/105; C02F 2209/18; C02F 3/1215
See application file for complete search history.

(56) References Cited

U.S. PATENT DOCUMENTS

| | | | |
|---|---|---|---|
| 4,797,212 A * | 1/1989 | von Nordenskjold | B01F 3/0412 210/199 |
| 6,129,104 A | 10/2000 | Ellard | |
| 7,153,429 B1 | 12/2006 | Pedros | |
| 8,034,243 B2 | 10/2011 | Janssen | |

(Continued)

OTHER PUBLICATIONS

International Search Report and Written Opinion for International Application No. PCT/US2015/053765 dated Jan. 20, 2016.

*Primary Examiner* — Patrick J Orme
(74) *Attorney, Agent, or Firm* — Nields, Lemack & Frame, LLC

(57) ABSTRACT

A central controller is used in a treatment method and system for removing at least one of nitrogen or phosphorus from wastewater. Based on data received from a plurality of sensors, each of which is coupled to a component of a wastewater treatment system, a control signal is sent from the central controller to at least one chemical delivery system, which dispenses at least one chemical compound into the wastewater in an amount effective to reduce the level of nitrogen or phosphorus in the wastewater.

16 Claims, 10 Drawing Sheets

(56) References Cited

U.S. PATENT DOCUMENTS

| | | |
|---|---|---|
| 2011/0132836 A1 | 6/2011 | Olson |
| 2012/0211417 A1 | 8/2012 | Vegso |
| 2012/0255902 A1* | 10/2012 | Livingston ........... B01D 61/145 |
| | | 210/607 |
| 2014/0034573 A1 | 2/2014 | Liu |
| 2014/0116957 A1 | 5/2014 | Woo |
| 2014/0319055 A1* | 10/2014 | Doyle .................... C02F 3/006 |
| | | 210/614 |

* cited by examiner

CONTROL SYSTEM FOR NITROGEN AND PHOSPHORUS REMOVAL

CROSS REFERENCE TO RELATED APPLICATIONS

This application claims priority of U.S. Provisional Patent Application Ser. No. 62/133,594, entitled "CONTROL SYSTEM FOR DENITRIFICATION AND PHOSPHORUS REMOVAL", and filed Mar. 16, 2015, which is incorporated herein by reference.

FIELD OF THE INVENTION

The present invention relates to systems and methods for wastewater treatment. The systems and methods of the present invention, which employ a central controller, may be used to control denitrification and the removal of phosphorus from wastewater.

BACKGROUND OF THE INVENTION

Efficient wastewater treatment is necessary to maintain the chemical, physical, and biological integrity of the environment. The Clean Water Act has established standards for discharges from all municipal wastewater treatment plants discharging to surface water. The treatment of wastewater involves the removal of dense particles, debris, and organic solids. Additional treatment can also be employed to remove colloidal and soluble organic matter. In more advanced wastewater treatment plants, steps may be taken to remove nutrients, defined as compounds containing nitrogen and phosphorus, and the effluent may be filtered.

Nutrient removal is becoming more important as the effects of excessive nutrients on waterways is better understood. High nitrogen and phosphorus concentrations have been identified as sources of excessive phytoplankton and algae growth, which in turn leads to the eutrophication, or hypertrophication, of waterways. Excessive phytoplankton and algae growth often leads to blooms, which may lead to hypoxia and anoxia and the death of native fish and aquatic species.

To remove excess nutrients from wastewater, processes have been developed to remove nitrogen containing compounds from the wastewater and remove phosphorus from the wastewater. State of the art wastewater treatment facilities create different environmental conditions in selectors, defined as aerobic (i.e. presence of free dissolved oxygen in the wastewater), anoxic (i.e., absence of free dissolved oxygen but presence of oxidized forms of nitrogen such as nitrate and nitrite), anaerobic (i.e., absence of free dissolved oxygen and oxidized forms of nitrogen) and settling selectors, to accomplish nitrogen and phosphorus removal. These selectors are often maintained in separate tanks or vessels that are configured in a specific manner to accomplish contaminant removal objectives. One such process currently in use is the Bardenpho® nutrient removal system. The Bardenpho® process uses suspended microbial mass, called activated sludge, transferred through a series of selectors to remove nitrogen and phosphorus in addition to the dissolved organic (carbonaceous or carbon-containing) material. A five stage Bardenpho® comprises five selectors: an anaerobic selector, a first anoxic selector, an aerobic selector, a second anoxic selector, and a re-aeration selector.

Activated sludge in the anaerobic selector is stressed in the presence of carbonaceous materials, resulting in phosphorus release from the activated sludge that allows even greater levels of phosphorus to be removed from the wastewater in subsequent anoxic and aerobic selectors via a process called enhanced biological phosphorus removal (EBPR). Externally added carbonaceous material (i.e., a carbon source) can be added in this anaerobic selector to improve the EBPR process by generating a greater phosphorus release in the selector, resulting in higher EBPR activity and greater phosphorus uptake in subsequent anoxic and aerobic selectors. In the first anoxic selector, oxidized forms of nitrogen (e.g., nitrite and nitrate) are reduced to gaseous nitrogen in the absence of free dissolved oxygen typically utilizing the carbonaceous material in the wastewater. This process of reducing nitrate and nitrite to gaseous nitrogen is called denitrification. A carbon source can be added in this selector to achieve more complete removal of nitrate and nitrite. Uptake of phosphorus also occurs in the anoxic selector by denitrifying phosphorus accumulating organisms (DPAOs). Oxygen is then added in the aerobic selector to oxidize ammonia and other reduced forms of nitrogen (e.g., organic nitrogen) as well as the remaining dissolved carbonaceous material, converting the reduced forms of nitrogen to nitrite and nitrate, a large portion of which is recycled to the first anoxic selector. In an EBPR process the majority of the biologically available phosphorus is taken up in the aerobic zone by phosphorus accumulating organisms (PAOs). In the second anoxic selector, the remaining nitrite and nitrate are denitrified to gaseous nitrogen in the absence of oxygen utilizing a carbon source since the carbonaceous material in the wastewater is typically fully consumed (i.e., oxidized) in the nitrification (i.e., aerobic) selector. Conditions in this second anoxic selector can also be made to be similar to those in the anaerobic selector using the external carbon source as the driver to create those conditions, allowing for additional phosphorus removal in the re-aeration selector. Following re-aeration, a metal compound can be added to precipitate any remaining phosphorus in a chemical phosphorus removal step in a settling selector such as a clarifier.

In place of activated sludge, other systems have been developed which also utilize an external carbon source to denitrify the wastewater, utilize a carbon source to increase phosphorus removal by the EBPR process, and dose a metal compound for chemical phosphorus removal. For example, a fixed film denitrification filter can be utilized as a denitrification process. A metal compound can be added to a tertiary filter for chemical phosphorus removal. Additionally, EBPR processes can occur in side stream selectors and can contain a fixed film medium or a separate activated sludge process from the main stream selector group.

In some instances, environmental conditions can be modified in single tank systems such as a sequencing batch reactor. In a sequencing batch reactor the same vessel is used for aerobic, anoxic, anaerobic and settling steps. The wastewater is treated in a single batch and the environmental conditions are modified throughout the batch to accomplish nitrogen and phosphorus removal.

In some instances more than one condition can exist in a single selector. For example an anaerobic selector may be partially aerobic or anoxic at the influent of the selector and then transition to an anaerobic condition after free and chemically bound oxygen are reduced. In another example, a condition may be anoxic at the influent of a selector and may become anaerobic after nitrate and nitrite are removed via denitrification.

In many common configurations, such as activated sludge processes, although the selectors are often separate reactors, the activated sludge is common throughout the system. As the activated sludge passes through the different selectors, certain groups of bacteria perform different functions. For example, in an aerobic selector, nitrifying bacteria convert ammonium to nitrate and PAO's take up phosphorus. In anoxic selectors, a group of microorganisms called heterotrophs convert nitrate to nitrogen gas and DPAO's take up phosphorus. In anaerobic selectors, PAOs and DPAOs store energy in the form of polyhydroxylalkanoates (PHA) and other intracellular storage compounds and release phosphorus. Certain groups of bacteria are therefore more active in some selectors and less active (or not active at all) in others. Because the microbial population is the same throughout the system, the nitrogen and phosphorus treatment in one selector has a direct impact on the performance of another selector.

It is common in the art to add an external carbon source such as methanol, ethanol, other alcohols, acetate, glycerin, carbohydrates and other organic compounds such as hydrocarbons to stimulate denitrification, particularly in selectors in which the organic content in the wastewater has been consumed or is no longer readily biodegradable. The addition of carbon sources serves as an electron donor that the denitrifying bacteria utilize to convert nitrate to nitrogen gas. It is also common in the art to use a control strategy to appropriately dose the carbon source to achieve denitrification performance.

More recently, external carbon sources have been added for EBPR. The types of carbon sources that support EBPR are more restricted than those for denitrification. For example, methanol, the most widely used carbon source for denitrification is not known to support EBPR. Carbon sources that support EBPR are, or need to be, converted to volatile fatty acids or other precursors to PHA which are then stored intracellularly as PHA's and other storage products under anaerobic conditions concomitant with phosphorus release from intracellular polyphosphate. Commonly used carbon sources for EBPR are acetate, propionate, carbohydrates, glycerol, and the like. As the PAO's and DPAO's move from the anaerobic selector to other selectors, the stored PHA is oxidized using nitrate, nitrite or oxygen which results in energy production and uptake of phosphorus as intracellular polyphosphate. Therefore, in systems utilizing EBPR for phosphorus removal, the biochemistry occurring in the anaerobic zone has a direct impact on carbon utilization, nutrient removal and deoxygenation in subsequent selectors. Denitrification and EBPR processes are tightly linked in the treatment facility, even though the two processes may be occurring in separate selectors. A central control system that manages the carbon, nitrogen and phosphorus removal processes in multiple selectors within the treatment process optimizes overall system performance.

Chemical phosphorus removal is typically accomplished by adding metal salts such as calcium, aluminum and iron based compounds. Two examples are aluminum sulfate (alum) and ferric chloride. Other non-limiting examples include poly aluminum chloride, sodium aluminate, calcium hydroxide, ferrous chloride, ferric sulfate, ferrous sulfate and magnesium chloride. These metal salts can be added in different selectors but are most often added to selectors called settling tanks or clarifiers. When added to water, aluminum and iron salts take the form of metal hydroxides that bond with soluble phosphoate resulting in a metal-phosphate complex that precipitates out of the water. Metals form complexes with phosphorus, resulting in phosphorus precipitation. Rare earth metals and metal salts such as cerium chloride can also be used to remove phosphorus from water by forming chemical bonds with certain phosphorus species that result in phosphorus precipitation. Other metal compounds can be used in place of metal salts, such as metal oxides, so long as the metal is available to react with the phosphorus when dosed to the water treatment system. In all cases, the precipitated phosphorus compounds are typically removed from the wastewater with the waste solids, using methods such as sedimentation or filtration. It is common in the art to use a control strategy to appropriately dose the metal compound to optimize chemical phosphorus removal.

Other factors also influence the concentration of nitrogen and phosphorus within the wastewater during treatment. For example, phosphate accumulating organisms (PAOs) use stored polyphosphate as an energy source and release phosphorus in the anaerobic stage. Other organisms known as glycogen accumulating organisms (GAOs) take up volatile fatty acids (VFAs) from the wastewater and store them internally as glycogen. Unlike with PAOs, when GAOs form glycogen, it does not result in a phosphorus release into the wastewater. The populations of PAOs and GAOs in the wastewater are affected (and can be controlled) by specific operating conditions, for example, the pH of the wastewater and the age of the sludge. By using one or more feed control algorithms tied to process measurements, consumption of added carbonaceous material (i.e., an external carbon source) by other microbial processes that consume carbon in excess of the amount required by the target processes can be minimized or eliminated (e.g., external carbon consumption by GAOs and/or PAOs over the required amount needed by denitrifying microorganisms).

The demands on wastewater treatment plants are known to vary dramatically. Seasonal and usage demands vary greatly throughout the year. With these changes, it is often difficult to maintain constant effluent concentrations and comply with discharge requirements. It is therefore desirable to develop a wastewater treatment system that can efficiently adjust to changing demands.

Wastewater treatment plants are often operated using constant external carbon source feed systems. With constant feed systems, the addition rate of external carbon source and/or metal compound is kept constant. This feed system can have many drawbacks. Constant feed systems are unable to adapt to the constantly changing needs of the wastewater treatment system. Therefore, it is often necessary to overcompensate with the amount of external carbon source or metal compound fed to the system. This leads to wasted resources and extra strain on the wastewater treatment system. During times of peak nutrient influx, the constant feed system may not be able to adequately remove nitrogen and phosphorus from the wastewater.

More advanced wastewater treatment systems may use a nitrogen sensor to detect the amount of nitrogen within the incoming wastewater. This system may adjust the amount of external carbon source based on the detected incoming nitrogen level. However, these systems may be slow to react to rapidly changing influx conditions and/or may not adequately provide for phosphorus removal.

Computer controlled processes and systems for the automatic dose control of wastewater treatment chemicals and the denitrification of wastewater streams are known in the art, as exemplified by U.S. Pat. Nos. 6,129,104; 7,153,429; and 8,034,243 and U.S. Pub. No. 2012/0211417 (the entire disclosures of each of which are incorporated herein by reference in their entireties for all purposes). However, there remains a need in the art of wastewater treatment systems for more advanced controls. Such advanced controls may improve the removal of nitrogen and phosphorus from wastewater, improve the reaction time for changing conditions, improve reliability of final effluent discharge compliance, and/or reduce the amount of external carbon source and metal compound needed by the system.

SUMMARY OF THE INVENTION

Denitrification, EBPR and chemical phosphorus removal are three different processes currently used to remove nitrogen and phosphorus from wastewater. These processes often are carried out in different vessels or at different times in a wastewater treatment system. Typically, individual control schemes are provided for each of these processes, using a variety of control algorithms such as feed forward, feedback, proportional-integral-derivative (PID) control and so forth. However, the aforementioned processes are interrelated, because the effectiveness (or lack thereof) of one process can have a direct impact on one or more of the other processes. Independent process control strategies are deficient because the information utilized as inputs to the control system are almost always isolated to a specific selector; the outcome of the particular control strategy on other selectors or unit processes is thus not taken into consideration. The present invention provides a way to manage multiple wastewater treatment processes in concert, using a central controller. The invention addresses the fact that although various processes related to nitrogen and phosphorus removal are occurring in different vessels, different selectors and at different times, these processes are interrelated as the activated sludge is, in many cases, common to the entire treatment system and parameters within one selector have an impact on parameters within other selectors.

A first aspect of the present invention relates to a method of removing at least one of nitrogen or phosphorus from wastewater, comprising:
collecting data from a plurality of sensors, wherein each sensor measures at least one parameter in a selector of a wastewater treatment system;
receiving the data from the plurality of sensors in a central controller, wherein the central controller comprises a plurality of control loops, wherein each control loop is adapted to control a single water treatment process in a selector and i) at least two of the control loops receive data from at least two common sensors coupled to different selectors of the wastewater treatment system and/or ii) at least one control loop receives data from at least one other control loop, wherein the data received from the plurality of sensors are utilized to determine a level of a chemical compound required to adjust the level of nitrogen or phosphorus present in the wastewater to a preselected target level; and
sending a control signal from the central controller to at least one chemical delivery system to dispense an amount of the chemical compound into the wastewater effective to achieve the preselected target level of nitrogen or phosphorus in the wastewater.

The present invention also relates to a method according to the first aspect, wherein one or more of said sensors measure one or more process parameters selected from the group consisting of influent flow rate, effluent flow rate, amount of chemical compound added into the wastewater, concentration of a substance within the wastewater, oxidation reduction potential of the wastewater, soluble chemical oxygen demand of the wastewater, intracellular carbon content, organic content of the wastewater, pH, alkalinity, and combinations thereof.

The present invention further relates to the method of the first aspect, wherein one or more of said sensors measure the concentration of at least one substance in the wastewater selected from the group consisting of nitrate, nitrite, nitrous oxide, nitric oxide, dissolved oxygen, phosphorus, total phosphorus, orthophosphate and reactive phosphorus, and combinations thereof.

In addition, the present invention relates to the method of the first aspect, wherein said sensors are located in one or more locations within the wastewater treatment system.

The present invention further relates to a method of the first aspect, wherein each water treatment process is selected from the group consisting of denitrification processes, enhanced biological phosphorus removal processes, and chemical phosphorus removal processes. In a further embodiment, the present invention relates to a method wherein at least one water treatment process is a denitrification process selected from the group consisting of denitrification in an anaerobic zone, denitrification in a pre-anoxic zone, denitrification in a post-anoxic zone, denitrification in a tertiary process, and combinations thereof. In another embodiment, the present invention relates to a method, wherein at least one water treatment process is an enhanced biological phosphorus removal process selected from the group consisting of enhanced biological phosphorus removal in which phosphorus release occurs in an anaerobic zone, enhanced biological phosphorus removal in which phosphorus release occurs in a post-anoxic zone, and combinations thereof.

The present invention also relates to the method of the first aspect, wherein said chemical compound is selected from the group consisting of methanol, acetate, propionate, carbohydrates, glycerol, hydrocarbons, alcohols and combinations thereof.

The present invention also relates to a method of the first aspect, wherein said chemical compound is selected from the group consisting of calcium and calcium salts, aluminum and aluminum salts, iron and iron salts, magnesium and magnesium salts, rare earth metals and rare earth metal salts, metal oxides, and combinations thereof.

The present invention also relates to a method of the first aspect, wherein at least two of the control loops work in concert to achieve denitrification and biological phosphorus removal, in the same or different treatment vessel, by controlling two or more chemical metering pumps that inject the same or different carbon sources into the wastewater.

The present invention also relates to a method of the first aspect, wherein at least two of the control loops work in concert to achieve denitrification without encouraging biological phosphorus removal.

The present invention further relates to a method in accordance with the first aspect, wherein at least two of the control loops work in concert to achieve denitrification and chemical phosphorus removal, in the same or different treatment vessel, by controlling two or more chemical metering pumps that inject one or more of the same or different carbon sources and one or more of the same or different metal compound into the wastewater.

The present invention also relates to a method in accordance with the first aspect, wherein at least two of the control loops work in concert to achieve biological phosphorus removal and chemical phosphorus removal, in the same or different treatment vessel, by controlling two or more chemical metering pumps that inject one or more of the same or different carbon sources and one or more of the same or different metal compound into the wastewater.

The present invention further relates to a method of the first aspect, wherein at least two of the control loops work in concert to achieve denitrification, biological phosphorus removal and chemical phosphorus removal of the wastewater, in the same or different treatment vessel, by controlling two or more chemical metering pumps that inject one or more of the same or different carbon sources and one or more of the same or different metal compound into the wastewater.

The present invention also relates to a method of the first aspect, wherein the central controller controls parallel wastewater process trains.

A second aspect of the present invention relates to a water treatment system for removing at least one of nitrogen or phosphorus from wastewater comprising:
 a plurality of sensors, wherein each sensor is coupled to a selector of the water treatment system;
 at least one chemical delivery system for delivering to the wastewater at least one chemical compound for removing nitrogen or phosphorus in the wastewater; and
 a central controller comprising a plurality of control loops,
 wherein each control loop is configured to control a denitrification process, a chemical phosphorus removal process, or an enhanced biological phosphorus removal process, and at least one of the following conditions are met:
  i) at least two of the control loops are adapted to receive signals from at least two common sensors coupled to different selectors of the water treatment system;
  ii) at least one control loop is adapted to receive a signal from another control loop for determining an amount of at least one chemical compound to be dispensed into the wastewater to remove nitrogen or phosphorus in the wastewater.

The present invention also relates to systems and methods for controlling denitrification and phosphorus removal.

A third aspect of the invention relates to a water treatment system comprising:
 a vessel configured to receive wastewater;
 an external carbon source to dispense carbon-containing supply to the vessel;
 a first sensor;
 a second sensor;
 a controller in communication with the first sensor and the second sensor;
 wherein the first sensor and the second sensor are configured to measure at least one parameter of the wastewater chosen from the concentration of at least one compound or class of compound chosen from phosphorus, orthophosphate, nitrate, nitrite, nitrous oxide, nitric oxide, organic compounds, magnesium, potassium, dissolved oxygen, volatile fatty acids, volatile organic acids, and mixtures thereof; intracellular carbon content; influent flow rate; effluent flow rate; oxidation reduction potential; pH; alkalinity; and combinations thereof;
 wherein said controller is configured to adjust a rate of addition of the external carbon source based on the measurements of the first sensor and the second sensor.

The present invention also relates to the water treatment system of the third aspect, wherein the first sensor is positioned upstream of the vessel and the second sensor is positioned downstream of the vessel.

The present invention further relates to the water treatment system of the third aspect, further comprising an external metal compound source coupled to dispense a metal compound to the vessel, and wherein said controller is further configured to adjust a rate of addition of the external metal compound source based on the measurements of at least one sensor.

The present invention also relates to a water treatment system of the third aspect, further comprising a second external carbon source coupled to dispense a second carbon-containing supply to the vessel, wherein said controller is further configured to adjust a rate of addition of the second external carbon source based on the measurements of at least one sensor.

A fourth aspect of the invention relates to a method of treating wastewater comprising:
 collecting input data from a first sensor;
 collecting input data from a second sensor;
 sending said input data from said first and second sensors to a controller, wherein said controller comprises at least one algorithm;
 performing calculations based on said input data from said first and second sensors with said algorithm to generate a primary output signal;
 sending the primary output signal from said controller to a primary chemical feed pump;
 wherein the first input and the second input comprise at least one measurement of the wastewater chosen from the concentration of at least one compound or class of compound chosen from phosphorus, orthophosphate, nitrate, nitrite, nitrous oxide, nitric oxide, organic compounds, magnesium, potassium, dissolved oxygen, volatile fatty acids, volatile organic acids, and mixtures thereof; influent flow rate; effluent flow rate; oxidation reduction potential; intracellular carbon content; organic content of the wastewater; pH; alkalinity; and combinations thereof;
 wherein said at least one primary chemical feed pump feeds a primary carbon containing (i.e., organic) electron donor to a vessel containing the wastewater.

The invention also relates to a method of the fourth aspect, wherein said first sensor is positioned upstream of said vessel and said second sensor is positioned downstream of said vessel.

The invention also relates to a method of the fourth aspect, wherein said primary output signal from said controller is calculated to feed the organic electron donor in an amount sufficient to denitrify the wastewater.

The invention also relates to a method of the fourth aspect, wherein said primary output signal from said controller is calculated to feed the organic electron donor in an amount sufficient to denitrify the wastewater and promote enhanced biological phosphorus removal.

The invention also relates to a method of the fourth aspect, wherein said primary output signal from said controller is calculated to feed the organic electron donor in an amount sufficient to denitrify the wastewater while preventing enhanced biological phosphorus removal and the consumption of the organic electron donor by other processes.

The invention also relates to a method of the fourth aspect, further comprising sending one or more additional output signals from said controller to one or more additional chemical feed pumps, wherein the one or more secondary chemical feed pumps feeds one or more compositions chosen from one or more of a metal compound and a secondary organic electron donor, wherein said secondary organic electron donor is the same or different than said primary organic electron donor.

The invention also relates to a method of the fourth aspect, wherein the at least one additional output signal from said controller is calculated to feed the secondary organic electron donor to the wastewater in an amount sufficient to promote enhanced biological phosphorus removal.

The invention also relates to a method of the fourth aspect, wherein the at least one additional output signal from said controller is calculated to feed the metal compound to the wastewater to promote chemical phosphorus removal.

The invention also relates to a method of the fourth aspect, wherein a first additional output signal from said controller is calculated to feed the secondary organic electron donor to the wastewater in an amount sufficient to promote enhanced biological phosphorus removal, and a second additional output signal is calculated to feed a metal compound to the wastewater to promote chemical phosphorus removal.

A fifth aspect of the invention relates to a feed-forward control method for treating wastewater comprising:

measuring a flow rate of wastewater entering a treatment vessel;

measuring a nitrate and/or nitrite concentration of said wastewater entering the treatment vessel;

calculating an amount of an external carbon source based on the flow rate, and nitrate and/or nitrite concentration; and dispensing the amount of external carbon source to denitrify the wastewater.

The invention also relates to a method of the fifth aspect, further comprising:

measuring a phosphorus concentration of said wastewater entering the treatment vessel;

calculating the amount of an external carbon source based on the flow rate, phosphorus, nitrate and/or nitrite concentration; and dispensing the amount of external carbon source to denitrify and remove phosphorus from the wastewater.

The invention also relates to a method of the fifth aspect, further comprising:

measuring a phosphorus concentration of said wastewater entering the treatment vessel;

wherein calculating an amount of an external carbon source based on the flow rate, phosphorus, nitrate and/or nitrite concentration further comprises calculating the amount of an external carbon source required to prevent enhanced biological phosphorus removal and consumption of the external carbon source by other processes; and wherein dispensing the amount of external carbon source to denitrify the wastewater further comprises dispensing the amount of external carbon source to prevent enhanced biological phosphorus removal and consumption of the external carbon source by other processes.

The invention also relates to a method of the fifth aspect, further comprising:

measuring a phosphorus concentration of said wastewater entering the treatment vessel;

calculating an amount of an external metal compound based on the flow rate and phosphorus concentration; and dispensing the amount of external metal compound to chemically remove phosphorus from the wastewater.

The invention also relates to a method of the fifth aspect, further comprising:

measuring a phosphorus concentration of said wastewater entering the treatment vessel;

calculating an amount of a second external carbon source based on the flow rate and phosphorus concentration; and dispensing the amount of the second external carbon source to remove phosphorus from the wastewater;

wherein the second external carbon source is different from the external carbon source used to denitrify the wastewater.

The invention also relates to a method of the fifth aspect, further comprising:

measuring a phosphorus concentration of said wastewater entering the treatment vessel;

calculating an amount of a second external carbon source based on the flow rate and phosphorus concentration;

calculating an amount of an external metal compound based on the flow rate and phosphorus concentration;

dispensing the amount of the second external carbon source to promote enhanced biological phosphorus removal; and dispensing the amount of the external metal compound to promote chemical removal of phosphorus;

wherein the second external carbon source is the same or different from the external carbon source used to denitrify the wastewater.

A sixth aspect of the invention relates to a method for treating wastewater in a single tank comprising;

adding wastewater to the tank;

measuring a nitrate and/or nitrite level of the wastewater within the tank;

transferring the nitrate and/or nitrite level to a controller, wherein the controller comprises a first algorithm; and adding a first carbon source to the wastewater within said tank based on the first algorithm to denitrify the wastewater.

The invention also relates to a method of the sixth aspect, further comprising:

measuring a phosphorus level of the wastewater within the tank;

transferring the phosphorus level to the controller, wherein the controller further comprises a second algorithm; and adding a second carbon source to the wastewater within said tank based on said second algorithm once the nitrate and/or nitrite level in said tank is below a predetermined concentration to promote enhanced biological phosphorus removal.

The invention also relates to a method of the sixth aspect, wherein the first carbon source and the second carbon source are the same or different. When the first carbon source and the second carbon source are the same, denitrification and enhanced biological phosphorus removal can occur in the same tank using the same carbon source.

The invention also relates to a method of the sixth aspect, further comprising:

measuring a phosphorus level of the wastewater within the tank;

transferring the phosphorus level to the controller; and adding the first carbon source to the wastewater within said tank based on the first algorithm to denitrify the wastewater and prevent enhanced biological phosphorus removal and consumption of the carbon source by other processes.

The invention also relates to a method of the sixth aspect, further comprising:

measuring a phosphorus level of the wastewater within the tank;

transferring the phosphorus level to the controller, wherein the controller further comprises a second algorithm;

adding a metal compound to the wastewater within said tank based on said second algorithm to promote chemical phosphorus removal.

The invention also relates to a method of the sixth aspect, further comprising:

measuring a phosphorus level of the wastewater within the tank;

transferring the phosphorus level to the controller, wherein the controller further comprises a second algorithm;

adding a second carbon source and a metal compound to the wastewater within said tank based on said second algorithm to promote enhanced biological phosphorus removal and chemical phosphorus removal.

The invention also relates to a method of the sixth aspect, wherein the first carbon source and the second carbon source are different.

The invention also relates to a method of the sixth aspect, wherein the second carbon source is added to the wastewater within the tank based on the second algorithm once the nitrate and/or nitrite level in said tank is below a predetermined concentration.

DETAILED DESCRIPTION OF THE INVENTION

The following table provides an explanation of certain acronyms used in the description of the invention.

| N | Nitrogen |
| TN | Total Nitrogen |
| NO3 | Nitrate |
| NO3—N | Nitrate-Nitrogen |
| NO2 | Nitrite |
| NO2—N | Nitrite-Nitrogen |
| NOX—N | Nitrate + Nitrite as Nitrogen |
| P | Phosphorus |
| TP | Total Phosphorus |
| PO4—P | Orthophosphate or reactive phosphorus |
| COD | Chemical Oxygen Demand |
| sCOD | Soluble Chemical Oxygen Demand |
| EBPR | Enhanced Biological Phosphorus Removal |
| OHO | Ordinary Heterotrophic Organism |
| PAO | Phosphorus Accumulating Organism |
| DPAO | Denitrifying Phosphorus Accumulating Organism |
| PHA | Polyhydroxyalkanoate |
| ORP | Oxidation Reduction Potential |
| DO | Dissolved Oxygen |
| RAS | Return Activated Sludge |
| WAS | Waste Activated Sludge |
| EPS | Extracellular Polymeric Substances |
| SBR | Sequencing Batch Reactor |
| PID | Proportional-Integral-Derivative |
| GAO | Glycogen Accumulating Organism |
| TOD | Total Oxygen Demand |
| BOD | Biochemical Oxygen Demand |
| TOC | Total Organic Carbon |
| A2O | Anaerobic/Anoxic/Aerobic (Oxic) |

One aspect of the present disclosure relates to wastewater treatment systems with enhanced nitrogen and/or phosphorus removal. The systems in accordance with the present disclosure may be used in newly constructed wastewater treatment facilities, or retrofit to existing wastewater treatment facilities.

The wastewater treatment system comprises a vessel, an input which delivers wastewater to the vessel, and an output, through which the treated wastewater exits the vessel. As used herein, the term "vessel" generically describes the place where the wastewater is treated. Thus, the term "vessel" may describe a single tank or container, multiple tanks or containers, or a subdivided tank or container in which difference phases of the wastewater treatment may take place.

In at least one embodiment, the vessel comprises a single tank. Each phase of the wastewater treatment process takes place in the single tank.

Figure 1:
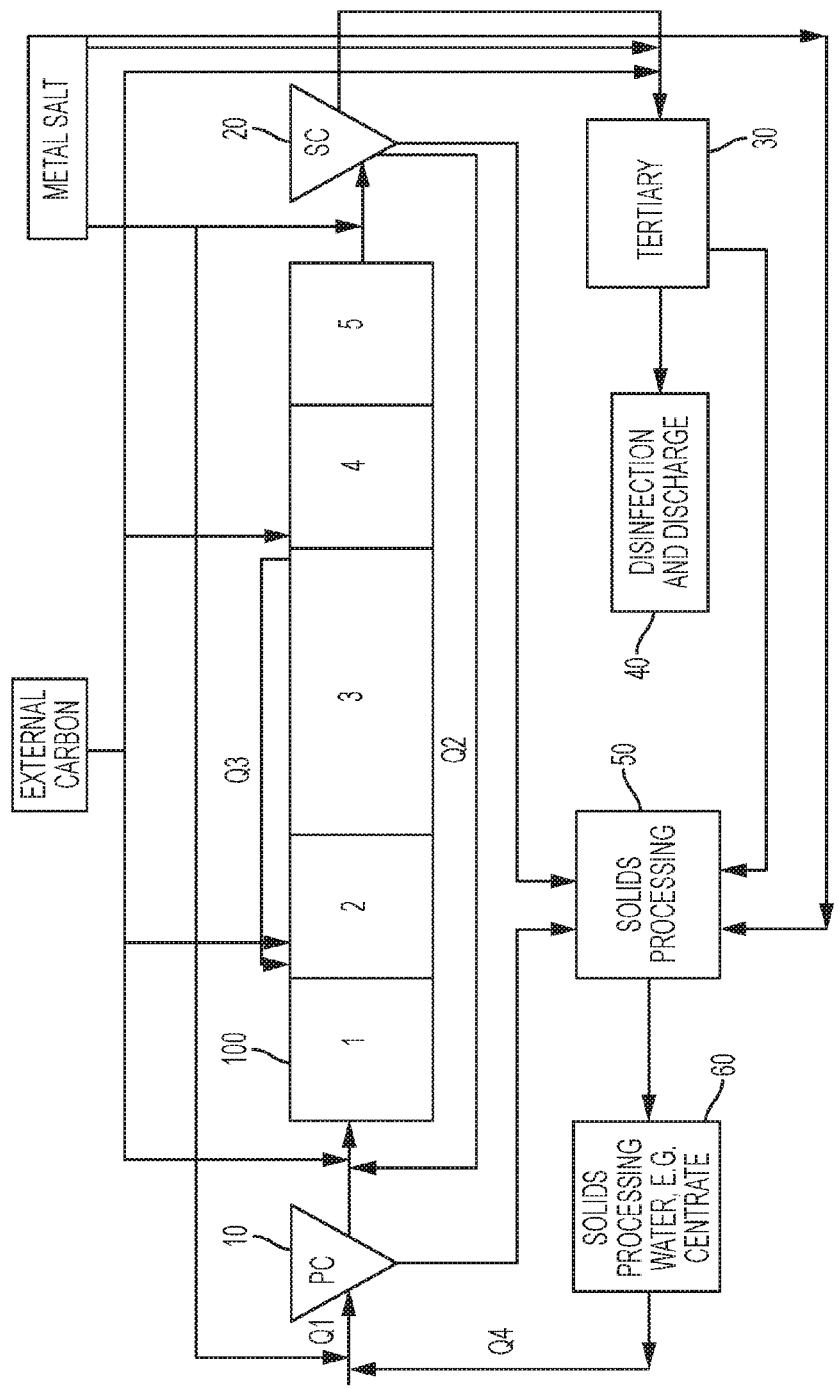
FIG. 1 is a schematic of a 5-tank wastewater treatment system.

In other embodiments, the vessel comprises a plurality of tanks, wherein each phase of the wastewater treatment process takes place in a different tank. For example, the system may comprise a series of at least 5 tanks, as shown in FIG. 1. In FIG. 1, vessel 100 comprises 5 tanks 1, 2, 3, 4, 5 arranged in a process configuration for a 5-stage Bardenpho® process.

Wastewater enters tank 1 after passing through primary clarifier 10, which removes solids from the influent. Tank 1 is an anaerobic selector (or zone) which encourages phosphorus release from cells in the presence of an external carbon source, such as volatile fatty acids (VFAs). The VFAs may be naturally occurring, or in at least one embodiment, added as an external carbon source.

In accordance with the present invention, the phrases "external carbon source" and "organic electron donor" are used interchangeably to refer to a composition comprising at least one hydrocarbon. In at least one embodiment, the external carbon source may comprise a mixture of hydrocarbons. The external carbon source acts as a carbon electron donor to promote biological denitrification and/or biological phosphorus removal. Other processes may also consume the external carbon source, such as the presence of GAOs which consume VFAs.

Examples of hydrocarbons include, but are not limited to, low molecular weight alcohols, such as methanol, ethanol, and propanol; volatile acids, such as acetic acid, propionic acid, and butyric acid; glycols, such as ethylene glycol and propylene glycol; glycerin; glycerol; carbohydrates; sodium or potassium acetate; and other hydrocarbon co-products or waste products from industry that may serve as a carbon electron donor. The external carbon source may comprise other additives or components so long as they do not interfere with the external carbon source's ability to promote the denitrification and/or phosphorus removal of the wastewater.

For enhanced biological phosphorus removal (EBPR), electron donors must be VFAs or a compound that can be converted into a VFA or other precursors to PHA end products or other end products that support EBPR. Many organic compounds can be fermented to VFAs if the conditions and reaction times are appropriate. One example of a suitable compound that may be used for EBPR is MicroC 2000™, which is a glycerin based compound that may be metabolized to form VFAs or precursors to PHA end products.

Tank 2 is a primary anoxic zone where denitrification occurs. In the primary anoxic zone, nitrite and nitrate are reduced to form nitrogen gas. The denitrification process requires a carbon source. The carbon may be already present in the wastewater, or the carbon source may be an external carbon source added to the wastewater.

Tank 3 is a primary aerobic zone. In tank 3, ammonia and organic forms of nitrogen are converted to nitrite and/or nitrate, which is an autotrophic process not requiring organic carbon compounds. Organic carbon present in the wastewater is also oxidized to carbon dioxide, and biological solids are generated. The aerobic conditions in tank 3 encourage phosphorus uptake by the cells present in the wastewater.

In tank 4, a second anoxic zone, denitrification occurs, reducing the nitrite and/or nitrate formed in tank 3 to nitrogen gas. As nitrite and nitrate concentrations become limiting, the second anoxic zone becomes partially anaerobic, which can result in phosphorus release if VFAs are present or added externally. At this point, organic carbon can also become limited, and an external carbon source may be added.

Tank 5 is a re-aeration zone in which some nitrification may occur and some phosphorus uptake may also occur.

The effluent from tank 5 then passes through a secondary clarifier 20, which removes biological solids from the system, and tertiary processor 30. A metal compound may be added in the secondary clarifier 20 and the phosphorus rich solids are removed in the waste sludge. A metal compound may be added to the tertiary processor 30, in a process known as phosphorus polishing. For example, metal salts that form aqueous metals solutions when added to water for chemical phosphorus removal are known in the art and include, for example, calcium hydroxide, magnesium chloride, ferric chloride, ferric sulfate, ferrous chloride, ferrous sulfate, aluminum sulfate, sodium aluminate, poly aluminum chloride and cerium chloride. The effluent then exists the system at output 40.

Other metal compounds may also be used. For example, the metal compound may be selected from metal oxides, such as cerium oxide.

As used herein, the term "metal compound" refers to metal salts, metal-containing materials, such as, for example, metal oxides, and mixtures thereof, capable of promoting the chemical removal of phosphorus. A metal salt source may comprise one or more metal salts. In use, the metal compounds may be in solid or liquid form, such as, for example, in solutions in which the metal compound is dissolved (e.g., an aqueous solution in which an ionic compound such as a metal salt is dissolved) or dispersed (e.g., a solution in which an insoluble metal compound such as cerium oxide is dispersed).

A portion of the solids removed in the system may be returned as return activated sludge, while the rest may be disposed of as waste activated sludge. The solids may be dewatered in solids processor 50 and the process water 60 may be reintroduced into the system.

In the 5-tank system described above, an external carbon source may be added in or before the anaerobic zone, in the primary anoxic zone, in the secondary anoxic zone, in the tertiary processor, or in a sidestream process for denitrification and/or EBPR, such as after solids processor 50 (not shown). The external carbon source may be added to support denitrification and/or EBPR.

Similarly, metal compounds may be added for chemical phosphorus removal in or before the primary clarifier 10, in or before the secondary clarifier 20, in or before the tertiary processor 30, the solids processor 50, or another location throughout the system.

When the vessel is a single tank, all of the above steps described in tanks 1-5 may take place as a batch operation in the single tank.

The wastewater treatment systems in accordance with the present disclosure may comprise at least two sensors. The sensors used in the systems may measure at least one parameter chosen from oxidation reduction potential, pH, alkalinity, flow rates, concentrations (e.g., phosphorus, orthophosphate, nitrate, nitrite, nitrous oxide, nitric oxide, organic compounds, magnesium, potassium, dissolved oxygen, volatile organic acids (VOAs), VFAs, and mixtures thereof), or any other parameter capable of being measured by a sensor.

As used herein, the term "sensor" is used to describe both in situ and ex situ detection devices, such as, for example, inline sensors and ex situ analyzers. An ex situ analyzer may comprise for example, a detection device in which a small sample of the wastewater is removed and filtered to measure one or more parameters within the detection device, often using wet chemistry.

In at least one embodiment, the system comprises at least one sensor for detecting nitrite/nitrate concentration and at least one sensor for detecting orthophosphate concentration. In at least one further embodiment, the system may comprise at least one flow sensor.

Figure 2:
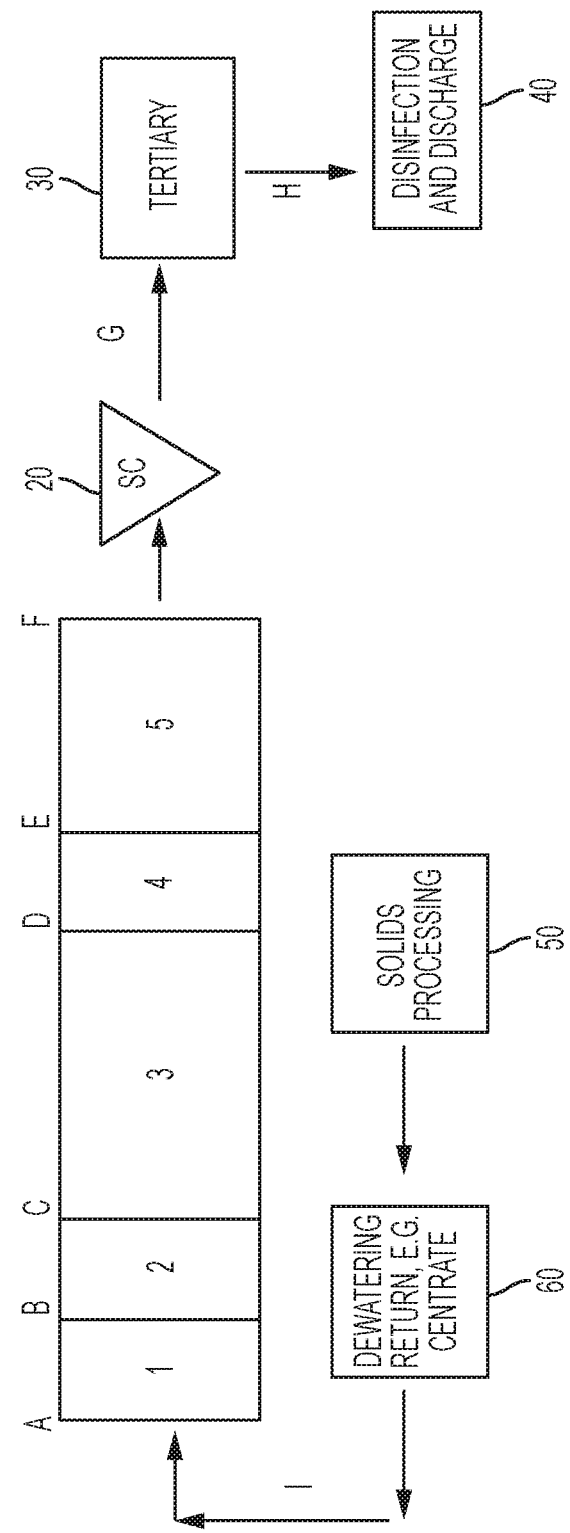
FIG. 2 is a schematic of sensor positions used in accordance with one embodiment of a wastewater treatment system.

Possible locations for sensors are shown in FIGS. 1 and 2. FIG. 1 illustrates the placement of four optional flow meters. Flow meter Q1 measures influent flow rates (Qinf) Flow meter Q2 measures the flow rate of return activated sludge (Qras). Internal recycle or nitrate recycle flow rates are measure by flow meter Q3 (Qnrcy), and flow meter Q4 measures the flow rate from dewatering and solids processing. Other flow meters may be used to detect the effluent flow rate from output 40.

FIG. 2 shows the possible placement for chemical concentration sensors. Orthophosphate concentrations may be measured, for example, at position A, the influent of anaerobic zone 1; position B, the effluent of anaerobic zone 1; positions C and E, the effluent of the anoxic zones 2 and 4, respectively; position D and F, the effluent of the aerobic zones 3 and 5, respectively; position G, the effluent of the secondary clarifier 20; position H, the effluent of tertiary processor 30; or other positions including positions throughout the various zones, for example, midway through the anaerobic zone, or within side-stream processes such as after solids processor 50.

Nitrate or combined nitrite/nitrate concentrations may be measured for example, at position A, the influent of anaerobic zone 1; at positions B and D, the influent of the anoxic zones 2 and 4; positions C and E, the effluent of the anoxic zones 2 and 4; or other positions.

Organic materials can be measured using biochemical oxygen demand (BOD), chemical oxygen demand (COD), total oxygen demand (TOD), total organic carbon (TOC), or other tests known to measure organic materials. BOD is a test based on the amount of oxygen needed by microorganisms to biodegrade organic compounds. COD is a test using a strong chemical to oxidize organic compounds. TOD is a test used to measure oxygen uptake as a result of combustion or other oxidative techniques. These tests may require the sampling of material to complete testing and therefore do not offer real-time results, although on-line spectrophotometric measurement at certain wavelengths of light can be used as an indirect measurement of wastewater organic content. Sensors can also quantify intracellular carbon content. These sensors are particularly useful in the EPBR process in which organic compounds from the wastewater and external carbon sources added to the wastewater are internalized or stored intracellularly by certain microorganisms such as PAOs and GAOs.

The sensors used in the wastewater treatment systems are in communication with a common, or central, controller (not shown). The controller is in communication with at least one chemical feed pump (not shown). The chemical feed pump may be connected to an external carbon source or a metal compound to deliver the external carbon source or metal compound to the system.

In at least one embodiment, the wastewater treatment system comprises at least two chemical feed pumps. The controller sends a first output signal to a first chemical feed pump to deliver an external carbon source, and sends a second output signal to a second chemical feed pump to deliver a metal compound.

In at least one embodiment, the wastewater treatment system comprises at least two external carbon sources fed from two separate chemical feed pumps as described above. A first external carbon source may be used to denitrify the wastewater, and a second external carbon source may be used to biologically remove phosphorus from the wastewater.

The controller may comprise a plurality of algorithms to precisely and accurately control the wastewater treatment process. For example, the controller may comprise a first algorithm capable of determining the external carbon source need for denitrification of the wastewater, and a second algorithm tailored to calculate the external carbon source need for EBPR.

In addition to the signals from the sensors, the controller may also receive other inputs to control the wastewater treatment process. For example, additional parameters may be entered directly into the controller, such as parameters based on measurements made in a laboratory using samples taken from the wastewater. Other inputs may be based on parameters that cannot be obtained directly from the wastewater using in situ or ex situ sensors.

In at least one embodiment, the wastewater treatment system comprises a single tank. A first algorithm determines the amount of external carbon source needed for denitrification, and a second algorithm determines the amount of external carbon source needed for EBPR. The controller may use a gradient to gradually shift the external carbon source feed from the first algorithm to the second algorithm as the nitrate to phosphorus ratio changes. The external carbon source for denitrification may be the same or different from the external carbon source for EBPR.

The controller may be programmed to use any one of a variety of control schemes. In at least one embodiment, the controller may comprise a proportional-integral-derivative (PID) feedback scheme. PID feedback schemes calculate an error value as the difference between a desired set point and the measured parameter at the effluent of a system or zone. For example, the PID scheme may measure the effluent nitrate concentration and alter the speed of the chemical feed pump. If the effluent nitrate value is above the set point, the speed of the chemical feed pump will be increased to promote additional denitrification. Conversely, if the nitrate value is below the set point, the chemical feed pump speed will be reduced to prevent waste of the external carbon source.

In other embodiments, the controller may comprise a feed forward scheme. In a feed forward scheme, the pump speed may be determined from an algorithm based on parameters measured at the influent of the system or a zone at a given time. The feed forward scheme does not use measures at the effluent of the system or zone for control as the feedback scheme does.

In yet other embodiments, the controller may comprise a feed forward scheme with PID feedback trim. A feed forward controller with PID trim may detect an influent disturbance (e.g., a spike in the nitrate concentration) and adjust the speed of the pump while also accounting for conditions at the effluent through the PID scheme and the time required for the influent disturbance to reach the effluent sensors.

The present invention also relates to methods for controlling wastewater treatment systems.

In at least one embodiment, the method for controlling the wastewater treatment system comprises collecting input data from a first sensor, collecting input data from a second sensor, and sending the input data to the controller. The controller may use an algorithm to send an output signal based on the input data. In at least one embodiment, the output signal is sent to a primary chemical feed pump that feeds a primary external carbon source to the wastewater treatment system.

The primary output signal may be used to calculate the amount of external carbon source sufficient to denitrify the wastewater and/or remove phosphorus from the wastewater.

In other embodiments, the primary output signal may be used to calculate the amount of external carbon source needed to denitrify the wastewater while preventing consumption of the external carbon source from other mechanisms, such as, for example, EBPR and other carbon-consuming processes. The external signal may be used to maintain one or more process parameters within a set value range that prevents or reduces the consumption of the external carbon source. For example, nitrate levels may be maintained above a set concentration to prevent EBPR and carbon source consumption by other processes.

In at least one embodiment, the first sensor is positioned upstream of the vessel and the second sensor is positioned downstream of the vessel.

In at least one embodiment, at least one additional output signal is sent from the controller to an additional chemical feed pump. The additional chemical feed pump may feed a composition chosen from a metal compound or a secondary external carbon source. The secondary external carbon source may be the same or different than the primary external carbon source.

According to at least one embodiment, the additional output signal from the controller results from an algorithm that determines an amount of external carbon source sufficient to promote EBPR. In other embodiments, an algorithm in the controller determines an amount of metal compound sufficient to chemically remove phosphorus from the wastewater. In yet other embodiments, more than one additional output signal is sent from the controller to separately feed both a secondary external carbon source and a metal compound.

In accordance with at least one embodiment of the present disclosure, the method for controlling the wastewater treatment system comprises a feed-forward controller. The feed-forward controller comprises at least one algorithm configured to calculate the amount of an external carbon source based on at least the flow rate and nitrate concentration of the wastewater entering the vessel. In at least one embodiment, the phosphorus concentration of the wastewater entering the vessel is also measured.

In at least one embodiment, the concentration of the nitrate and phosphorus is used to determine the amount of at least one external carbon source. The amount of external carbon source may be that needed to denitrify the wastewater and remove phosphorus or the amount needed to denitrify the wastewater and prevent EBPR or other carbon-consuming processes from occurring by maintaining a set nitrate level sufficient to prevent EBPR or carbon consumption by other processes.

In at least one embodiment, the concentration of the nitrate and phosphorus in the entering wastewater is used to calculate an amount of external carbon source to denitrify the wastewater and to calculate an amount of metal compound to chemically remove the phosphorus from the wastewater.

In at least one embodiment, the concentration of the phosphorus entering the vessel is used to calculate an amount of a second external carbon source needed to promote EBPR and to calculate an amount of a metal compound needed to promote chemical removal of phosphorus. In at least one embodiment, the second external carbon source may be the same or different than the first external carbon source.

At least one embodiment of the present disclosure relates to a method for treating wastewater in a single tank. The method may comprise adding wastewater to the tank and measuring a nitrate and/or nitrite concentration of the wastewater within the tank. The nitrate and/or nitrite concentration signal can be transferred to a controller, which comprises at least one algorithm that determines an amount of a first external carbon source which is added to the wastewater to denitrify the wastewater.

In at least one embodiment, the method further comprises measuring a phosphorus concentration of the wastewater within the tank and transferring that phosphorus concentration signal to the controller, which uses a second algorithm to determine an amount of external carbon source necessary to promote EBPR. The controller may delay the addition of the external carbon source to promote EBPR until the nitrate/nitrite concentrations have reached a certain amount. The controller may switch immediately to addition of the external carbon source using the second algorithm, or the controller may gradually transition from addition of the external carbon source based on the first algorithm to the second algorithm.

In at least one embodiment, the external carbon source for promoting EBPR is different than the external carbon source for denitrification of the wastewater.

According to at least one embodiment, the addition of the external carbon source may be controlled to maintain a minimum nitrate concentration to prevent the promotion of EBPR and the consumption of the external carbon source by other processes. Limiting EBPR, as well as other processes which consume the external carbon source, may prevent unnecessary consumption of the external carbon source.

In at least one embodiment, the method comprises denitrification of the wastewater in combination with chemical removal of phosphorus, which may be promoted by an algorithm that controls an amount of metal compound added to the wastewater.

In at least one further embodiment, the method may comprise denitrification, chemical phosphorus removal, and EBPR in the single tank treatment of the wastewater.

The next section describes several exemplary, illustrative embodiments of the invention for common wastewater treatment processes. Although these configurations are very specific, the interrelatedness of denitrification, EBPR and chemical phosphorus removal is true of any process configuration. There is a need for a central controller that manages two or more of these three processes in concert.

Many facilities utilize both EBPR and metal compound addition to achieve the desired effluent phosphorus concentrations. The two processes are interrelated in the following ways. The effectiveness of the EBPR process has a direct impact on the amount of metal compound required to achieve effluent goals. Likewise, metal compound addition has an impact on the availability of soluble phosphorus necessary to maintain the EBPR process. Although EBPR and chemical phosphorus removal typically occur in different selectors, the performance of one process has an impact on the other. For example, an overdose of metal compound in a secondary settling tank results in metal compound return in the RAS to the anaerobic zone, where the first step of EBPR occurs. Phosphorus concentrations are highest in the anaerobic zone and excess metal compound will bind with soluble phosphorus decreasing the amount available for the EBPR process. If this condition continues, PAO and DPAO activity will decline, resulting in higher doses of metal compound to achieve the desired effluent, compounding the issue. Eventually the EBPR process may deteriorate altogether. The present invention provides for a common controller that maintains effluent phosphorus concentration objectives by controlling both biological and chemical phosphorus removal processes in different selectors within the treatment facility.

Figure 3:
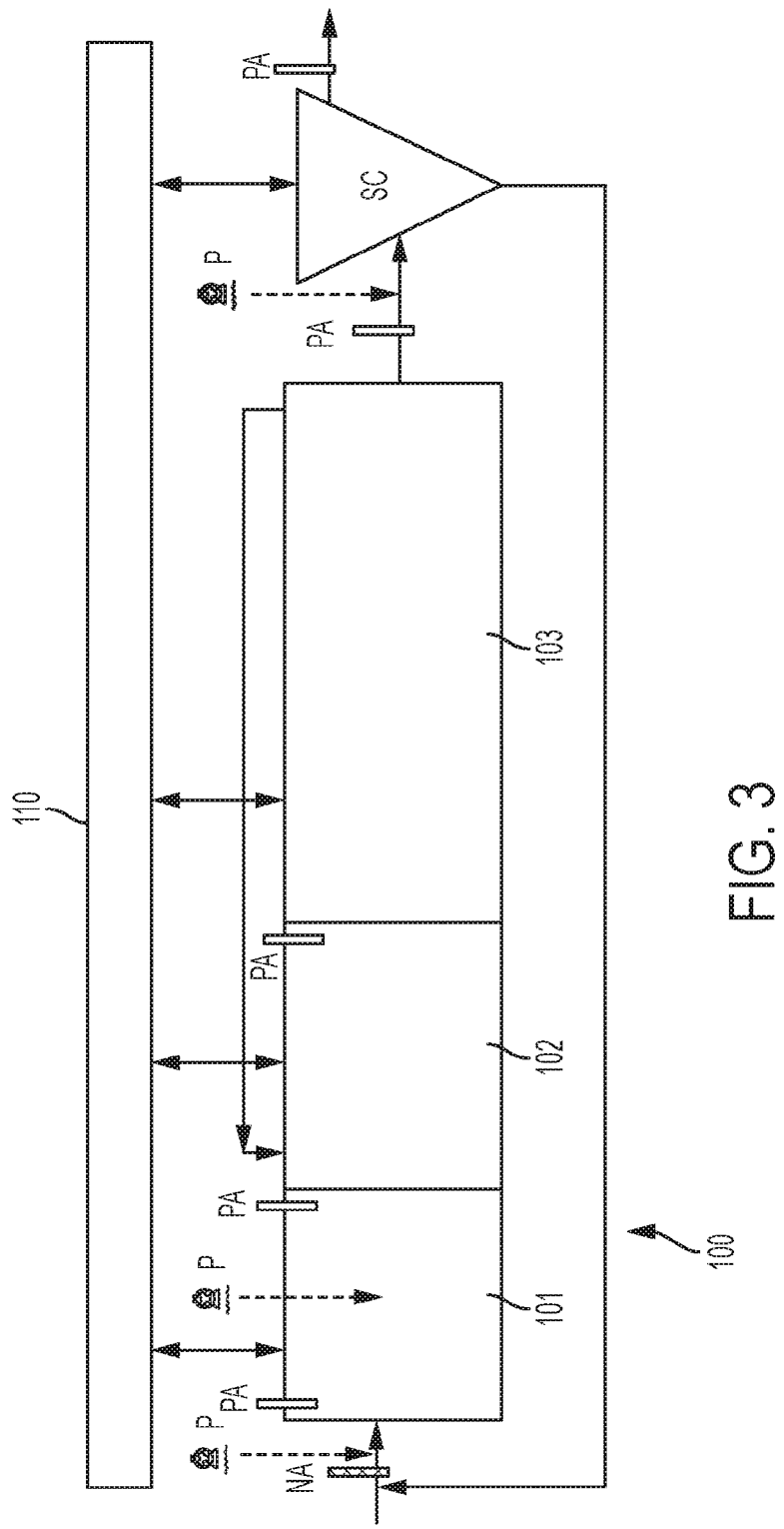
FIG. 3 is a schematic of the exemplary system for denitrification, EBPR and chemical phosphorus removal of Example 1.

Example 1: Interrelatedness of Denitrification, EBPR and Chemical Phosphorus Removal In this embodiment, which is illustrated in FIG. 3, the central controller 110 is accomplishing denitrification, EBPR and chemical phosphorus removal. The system 100 comprises an anaerobic zone 101, an anoxic zone 102, an aerobic zone 103, and settling tank SC. Nitrogen and phosphorus analyzers, NA and PA, respectively, are used to determine the nitrogen and phosphorus levels at various positions within the system 100. Pumps P dispense a carbon source or a metal compound to the system. The central controller 110 comprises a plurality of control loops (shown generally as double-headed arrows between the central controller and the components of the system) to communicate with the nitrogen and phosphorus analyzers, NA and PA, the pumps P, and other sensors that may be present within the anaerobic zone 101, an anoxic zone 102, an aerobic zone 103, and settling tank SC.

In the embodiment illustrated in FIG. 3, Loop 1A and 2A feed a carbon source for denitrification and EBPR in the anaerobic zone 101 and predicts the phosphorus uptake in the subsequent zones based on the phosphorus concentration, the amount of carbon added to the anaerobic zone 101 and other inputs. Phosphorus analyzers PA downstream of the anaerobic zone 101 feed information back to Loop 2A, allowing for a comparison of actual measurements to predicted measurements. Loop 3A doses a metal compound for chemical phosphorus removal downstream of the biological reactors. This control loop measures influent and effluent phosphorus of the selector and doses a metal compound to maintain the desired amount of removal of effluent phosphorus concentration.

Further aspects of the system illustrated in FIG. 3 may be summarized as follows:
Control Loop 1A—Denitrification in anaerobic zone 101.
Control Loop 2A—EBPR in anaerobic zone 101.
Control Loop 3A—Metal compound in settling tank SC.
Control Loop 1A
  Inputs
    Flow Signals: Qinf, Qras, Qnrcy, Qother.
    Analyzer Signals: NOX-N, NO3, NO2, DO, ORP, others.
  Outputs
    Signal for carbon dose pump 1 for oxygen and NOX-N removal.
Control Loop 2A
  Inputs
    Flow Signals: Qinf, Qras, Qnrcy, Qother.
    Analyzer Signals: P, PO4-P, NOX-N, NO3, NO2, DO, ORP, others.
  Outputs
    Signal to carbon dose pump 2 to allow for dosing of carbon for EBPR.
Control Loop 3A
  Inputs
    Flow Signals: Qinf, Qras, Qnrcy, Qother.
    Analyzer Signals: P, PO4-P, pH, alkalinity, others.
  Outputs
    Signal to metal compound dose pump 3 to allow for chemical phosphorus removal.
Loop 1 and Loop 2 Interrelatedness:
Loops 1A communicates to Loop 2A (nitrate removal performance or capability thereof impacts EBPR processes).
Loop 2 and Loop 3 Interrelatedness:
Loop 2A communicates to Loop 3A (Loop 2A communicates EBPR performance to Loop 3A to adjust control strategy in Loop 3A to avoid over/under dose of metal compound).
Loop 3A communicates to Loop 2A (Loop 3A communicates chemical phosphorus removal performance to Loop 2A to adjust control strategy in Loop 2A to optimize biological phosphorus removal).

In practice, EBPR performance fluctuates and the amount of phosphorus released varies diurnally and seasonally. Also, the phosphorus load can vary as a result of biosolids processing and reintroduction of centrate, filtrate or other side stream process water that is rich in nitrogen and phosphorus. This results in variable influent phosphorus to the settling tank that in turn often results in spikes of the metal compound, which can then be returned in the RAS to the anaerobic zone 101. When the metal compound is returned to the anaerobic zone 101, where phosphorus concentrations are highest, the phosphorus precipitates and reduces the amount of available phosphorus for EBPR. If not controlled, the EBPR process will be compromised. The objective of Loop 3A is to achieve the desired phosphorus removal while avoiding precipitation in the anaerobic zone 101 and compromising EBPR performance. The central controller 110 manages both modes of phosphorus removal in concert to achieve phosphorus discharge objectives, conserve chemical cost and maintain the more sensitive EBPR process.

To demonstrate this interrelationship, a five-selector Bardenpho® configuration was simulated in a mathematical modeling program. Typical influent wastewater conditions and operating conditions were used in the model. Varying amounts of ferric chloride were dosed to the secondary settling tank and the impact on EBPR performance was evaluated.

Figure 4:
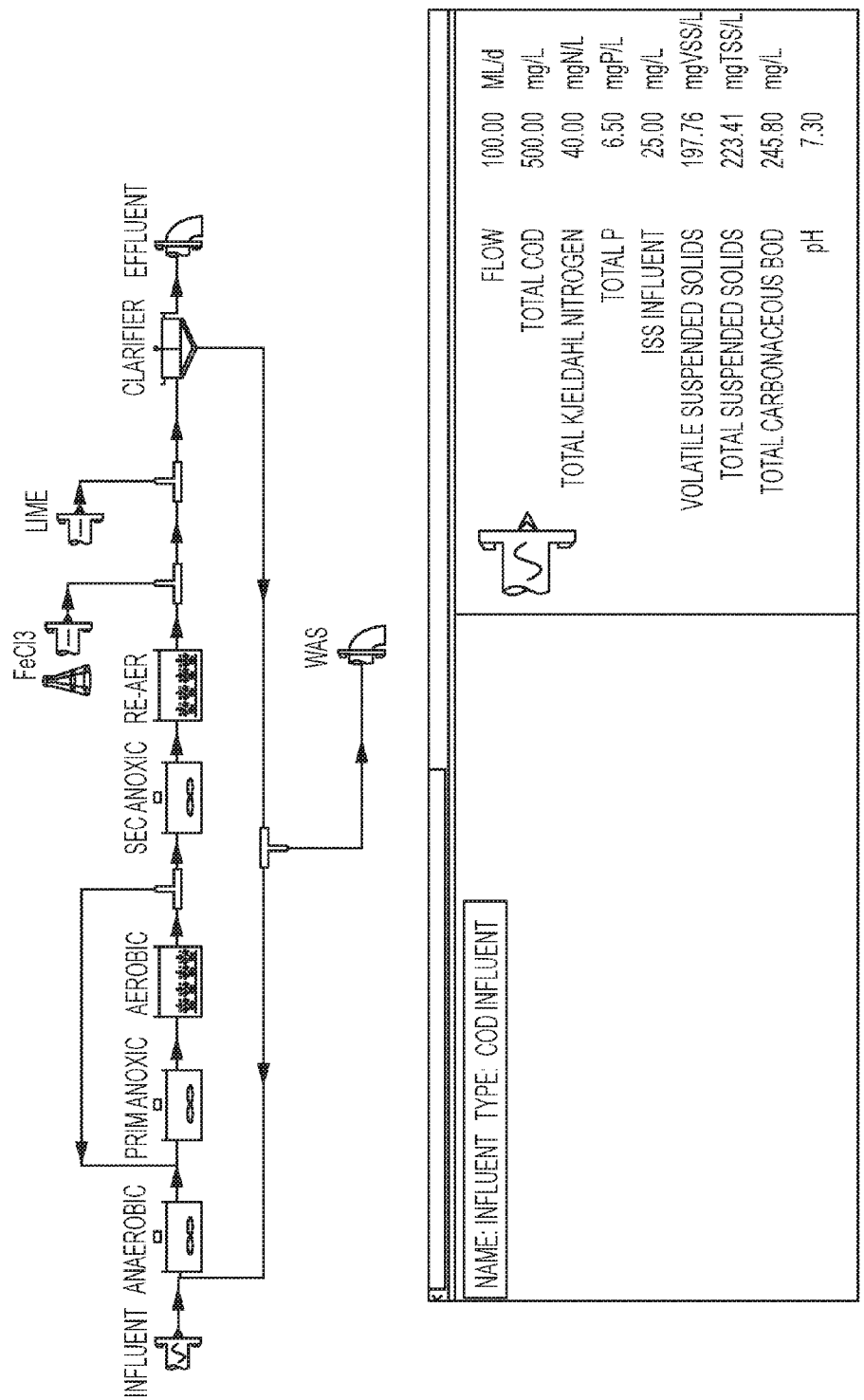
FIG. 4 contains graphical representations of the five-selector Bardenpho® system discussed in Example 1.

Graphical representations of the five-selector Bardenpho® system are depicted in FIG. 4. The central controller in this example may contain 6 or more different control loops: three denitrification control loops (1A denitrification in the anaerobic zone; 1B denitrification in the primary anoxic zone; 1C denitrification in the second anoxic zone) and two EBPR control loops (2A EBPR in the anaerobic zone; 2B EBPR in the post anoxic zone) and one chemical phosphorus control loop (3A Chemical Phosphorus removal in the settling tank). In this particular configuration, a central controller can dose a carbon source to the second anoxic zone to remove nitrate via control loop 1C. Denitrification performance in the second anoxic zone may directly impact the influent characteristics to the first zone via NOX-N return in the RAS. Thus despite that the primary anoxic and secondary anoxic selectors appear independent the influent characteristics of the anaerobic zone are impacted by effluent characteristics of the post anoxic zone. Additionally, as NOX-N concentrations are reduced in the second anoxic zone, conditions can become anaerobic resulting in additional P release and subsequent uptake in the re-aeration stage. In some instances, P release in the second anoxic zone may not be desired, either due to a less stringent phosphorus discharge limit or perhaps a limitation in phosphorus uptake capacity in the final aeration stage resulting in a net increase in soluble phosphorus in the final two zones. In this instance control loop 1C can maintain desired denitrification performance to prevent an anaerobic condition in the second anoxic zone.

In the instance where EBPR in the second anoxic zone is desired the central controller utilizes control loop 2B to dose the same or different carbon source to stimulate phosphorus release that is subsequently removed in the re-aeration selector. The performance of the two EBPR control loops (2A and 2B) are interrelated as changes in the effectiveness of loop 2A directly impact the performance objectives of 2B and vice versa.

Aspects of this system may be summarized as follows:
Control Loop 1A: Denitrification in anaerobic zone.
Control Loop 2A: EBPR in anaerobic zone.
Control Loop 1B: Denitrification in pre-anoxic zone.
Control Loop 1C: Denitrification in post-anoxic zone.
Control Loop 2B: EBPR in post-anoxic zone.
Control Loop 3A: Chemical Phosphorus Removal in the settling tank
Control Loop 1A, 1B, 1C
  Inputs
    Flow Signals: Qinf, Qras, Qnrcy, Qother.
    Analyzer Signals: NOX-N, NO3, NO2, DO, ORP, others.
  Outputs
    Signals to carbon dose pumps for oxygen and NOX-N removal.

Control Loop 2A, 2B
Inputs
   Flow Signals: Qinf, Qras, Qnrcy, Qother.
   Analyzer Signals: P, PO4-P, NOX-N, NO3, NO2, DO, ORP, others.
Outputs
   Signals to carbon dose pumps for EBPR.
Control Loop 3A
Inputs
   Flow Signals: Qinf, Qras, Qnrcy, Qother
   Analyzer Signals: P, PO4-P, pH, alkalinity, others.
Outputs
   Signal to metal compound for chemical phosphorus removal.
Loop 1 and Loop 2 Interrelatedness:
Loops 1A and 1B communicate to Loop 2A (nitrate removal performance or capability thereof impacts EBPR processes).
Loop 2A communicates to Loops 1A and 1B (carbon internalized for PHA formation as a result of Loop 2A impacts DO and NOX-N removal in selectors where Loop 1B is functioning).
Loop 1C communicates to Loops 1A and 1B (denitrification performance in the second anoxic zone impacts influent characteristics for Loops 1A and 1B).
Loop 1C communicates to Loop 2B (EBPR process in second anoxic zone is dependent on complete denitrification by Loop 1C).
Loops 2A and 2B communicate (EBPR loops communicate to moderate performance of the other, likely in a unidirectional manner).
Loop 2 and Loop 3 Interrelatedness:
Loop 2A and 2B communicate to loop 3A (EBPR performance is directly impacted by loop 3A performance by return of excess metal compound)
Loop 3A communicates to loop 2A (chemical phosphorus removal performance is communicated to loop 2A)

The table below shows the PO4-P concentration as the sum of soluble PO4-P and metal complexed PO4-P in each of the selectors at different ferric chloride feed rates. The ferric chloride feed rates used in this example were 0 L/day, 800 L/day and 5000 L/day. In the first example without ferric chloride addition, EBPR is the only means of phosphorus removal. The phosphorus concentrations are highest in the anaerobic selector where phosphorus release occurs. Phosphorus is taken up by DPAOs and PAOs in the anoxic and aerobic selectors downstream of the anaerobic selector. During this scenario, the PAO concentration is 163 mg COD/L. At a ferric chloride feed rate of 800 L/day, the final effluent phosphorus concentration improves as a result of the ferric chloride reacting with the phosphorus in the settling tank. The ferric chloride feed rate does not impact the EBPR process, however, as there is still phosphorus release and uptake in the biological selectors. Likewise, the PAO concentration remains unchanged.

In the third example, ferric chloride is dosed at a much higher rate (5000 L/day) and effluent phosphorus improves only slightly from 0.18 mg/L to 0.13 mg/L. The overdose of ferric chloride and return of ferric chloride in the RAS essentially eliminate the EBPR activity, as all of the PO4-P is now complexed with ferric chloride and there is no phosphorus release and uptake in the biological selectors. Likewise, PAO populations decline to levels insufficient to support EBPR.

| Selector | No Ferric Chloride PO4—P (Sol. + Me Complexed) mg phosphorus/L | Ferric Chloride 800 L/day PO4—P (Sol. + Me Complexed) mg phosphorus/L | Ferric Chloride 5000 L/day PO4—P (Sol. + Me Complexed) mg phosphorus/L |
|---|---|---|---|
| Influent | 3.25 | 3.25 | 3.25 |
| Anaerobic | 8.73 | 16.19 | 48.84 |
| Primary Anoxic | 4.12 | 11.63 | 48.52 |
| Aerobic | 0.9 | 8.45 | 48.41 |
| Secondary Anoxic | 0.82 | 8.34 | 48.45 |
| Re-aer | 0.44 | 8.01 | 48.46 |
| Effluent | 0.44 | 0.18 | 0.13 |
| PAO Organisms (mg COD/L) | 163 | 163 | 5.4 |

Figure 5:
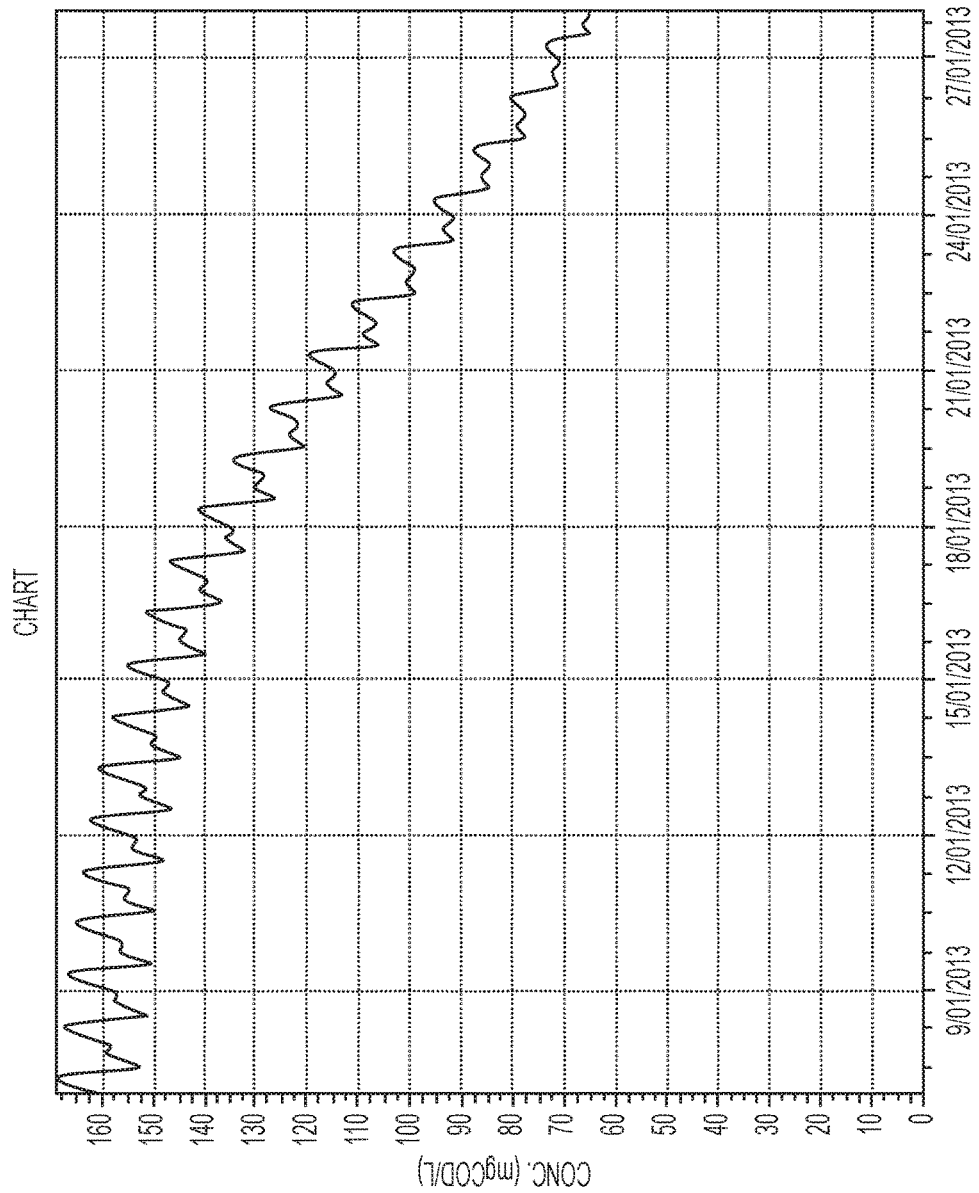
FIG. 5 is a graph which demonstrates a 21 day dynamic effect on the PAO population due to uncontrolled ferric chloride addition from 0 L/day to 5000 L/day, as further explained in Example 1.

FIG. 5 demonstrates a 21 day dynamic effect on the PAO population due to uncontrolled ferric chloride addition from 0 L/day to 5000 L/day. The PAO population declines from an average of 163 mg COD PAOs/L to 65 mg COD PAOs/L over the 21 day period and will continue to deteriorate over time.

This example demonstrates how the uncontrolled dose of a metal compound impacts the EBPR process in the biological selectors. Treatment facilities often struggle with this phenomenon as they are attempting to maintain the effluent phosphorus compliance and decreasing the metal compound feed rate is counterintuitive to maintaining compliance. As EBPR deteriorates, more metal compound is required, resulting in high chemical usage and costs and making it more difficult to recover the EBPR process. The common controller utilized in the method and system of the present invention achieves EBPR and chemical phosphorus in concert to maintain the EBPR process, reduce chemical usage and maintain effluent compliance.

Example 2: Denitrification and Chemical Phosphorus Removal

Denitrification and chemical phosphorus removal are commonly deployed at wastewater treatment facilities. In some configurations, tertiary denitrification processes, such as a denitrification filter, are utilized to denitrify residual NOX-N prior to discharge. Chemical phosphorus removal often occurs in selectors prior to the tertiary process, such as in a secondary settling tank. Diurnal variability in nitrogen and phosphorus load at wastewater treatment facilities is very common. In order to maintain a healthy and effective biomass in the tertiary denitrification process, the nitrogen to phosphorus ratio has to be balanced. In phosphorus limiting conditions the biomass may become stressed and exhibit extracellular polymeric substances (EPS) that can impact filter operations and compromise denitrification performance. In accordance with the present invention, a central controller may be used to manage both the chemical phosphorus removal process and denitrification process in concert, thereby enhancing treatment performance, effluent compliance and efficient chemical usage.

Figure 6:
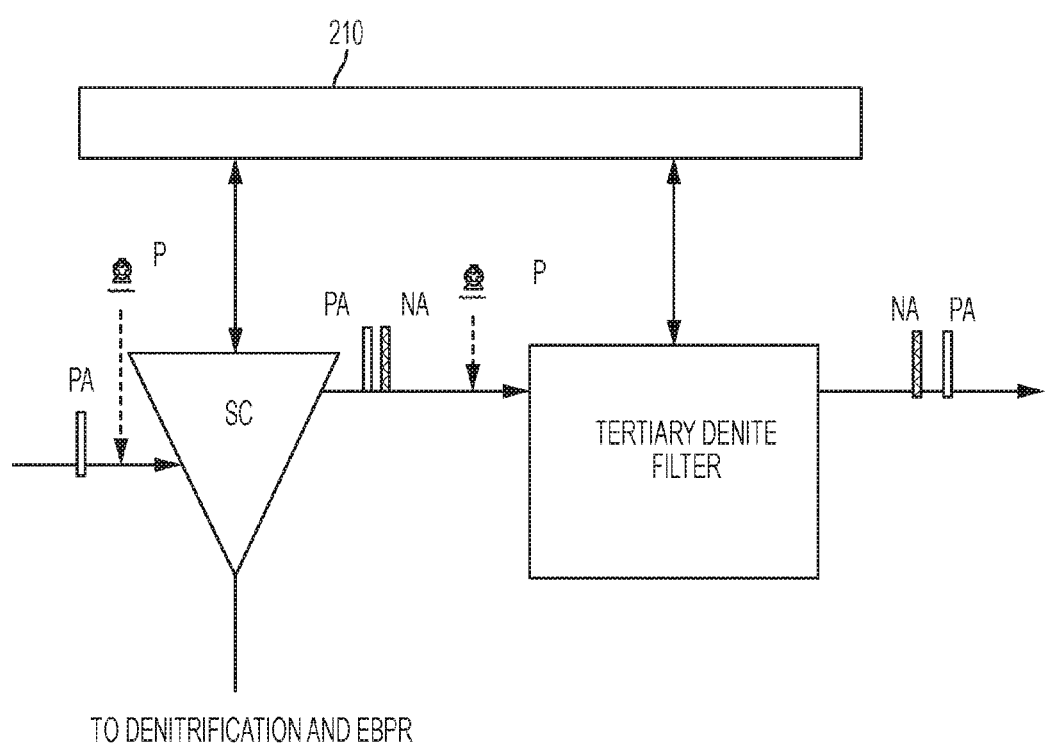
FIG. 6 is a schematic of the exemplary system for denitrification and chemical phosphorus removal of Example 2.

In this embodiment, as illustrated in FIG. 6, chemical phosphorus removal occurs in a secondary settling tank SC by the addition of a metal compound. Influent and effluent phosphorus, pH, alkalinity, other parameters and flow signals are inputs to Loop 3A in the controller 210 that doses metal compound based on the desired effluent phosphorus concentration. A tertiary denitrification process follows the secondary settling tank SC. This may be a fixed film unit process such as a sand filter or MBBR. A second control loop, Loop 1A, doses external carbon to accomplish denitrification in this reactor. A nitrogen and phosphorus analyzer NA, PA at the effluent of the denitrification reactor communicates performance back to loop 3A for additional refinement of the control algorithms. The controller 210 maintains the desired nitrogen to phosphorus ratio in the influent to the tertiary denitrification selector while ensuring effluent compliance.

A proper nitrogen to phosphorus ratio is necessary to maintain a healthy biomass. If this ratio is out of balance, for example, if the N:P ratio is too high and there is insufficient phosphorus to support the biomass, this results in a stressed environment and the biomass may form EPS and/or may not be capable of achieving the desired nitrogen removal. The present invention provides the capability of maintaining the proper amount of orthophosphate in the influent to the denitrification reactor to avoid a stressed condition. The required PO4-P concentration is based on the influent NOX-N concentration to the denitrification reactor. As the influent NOX-N concentration varies throughout the day, month, or season, the control loop 3A moderates the feed rate of the metal compound to maintain a desired N:P ratio in the influent.

Further aspects of the embodiment depicted in FIG. 6 may be summarized as follows:
Control Loop 1A: Denitrification in tertiary process.
Control Loop 3A: Metal compound addition for chemical phosphorus removal in settling tank.
Control Loop 1A
Inputs
  Flow Signals: Qinf, Qras, Qnrcy, Qother.
  Analyzer Signals: NOX-N, NO3, NO2, DO, ORP, others.
Outputs
  Signal to carbon dose pump for oxygen and NOX-N removal.
Control Loop 3A
Inputs
  Flow Signals: Qinf, Qras, Qnrcy, Qother.
  Analyzer Signals: NOX-N, P, PO4-P, pH, alkalinity others.
Outputs
  Signal to metal compound pump for P removal.
Loop 1 and Loop 3 Interrelatedness:
Loop 1A communicates to Loop 3A (Loops 1A and 3A communicate to maintain adequate N:P ratio, to prevent P-limiting conditions; direction of communication is dependent on selector configuration and analyzer locations).
Loop 3A communicates to Loop 1 (Loops 1A and 3A communicate to maintain adequate N:P ratio, to prevent P-limiting conditions; direction of communication is dependent on selector configuration and analyzer locations).

Example 3: Interrelatedness of EBPR and Denitrification

Figure 7:
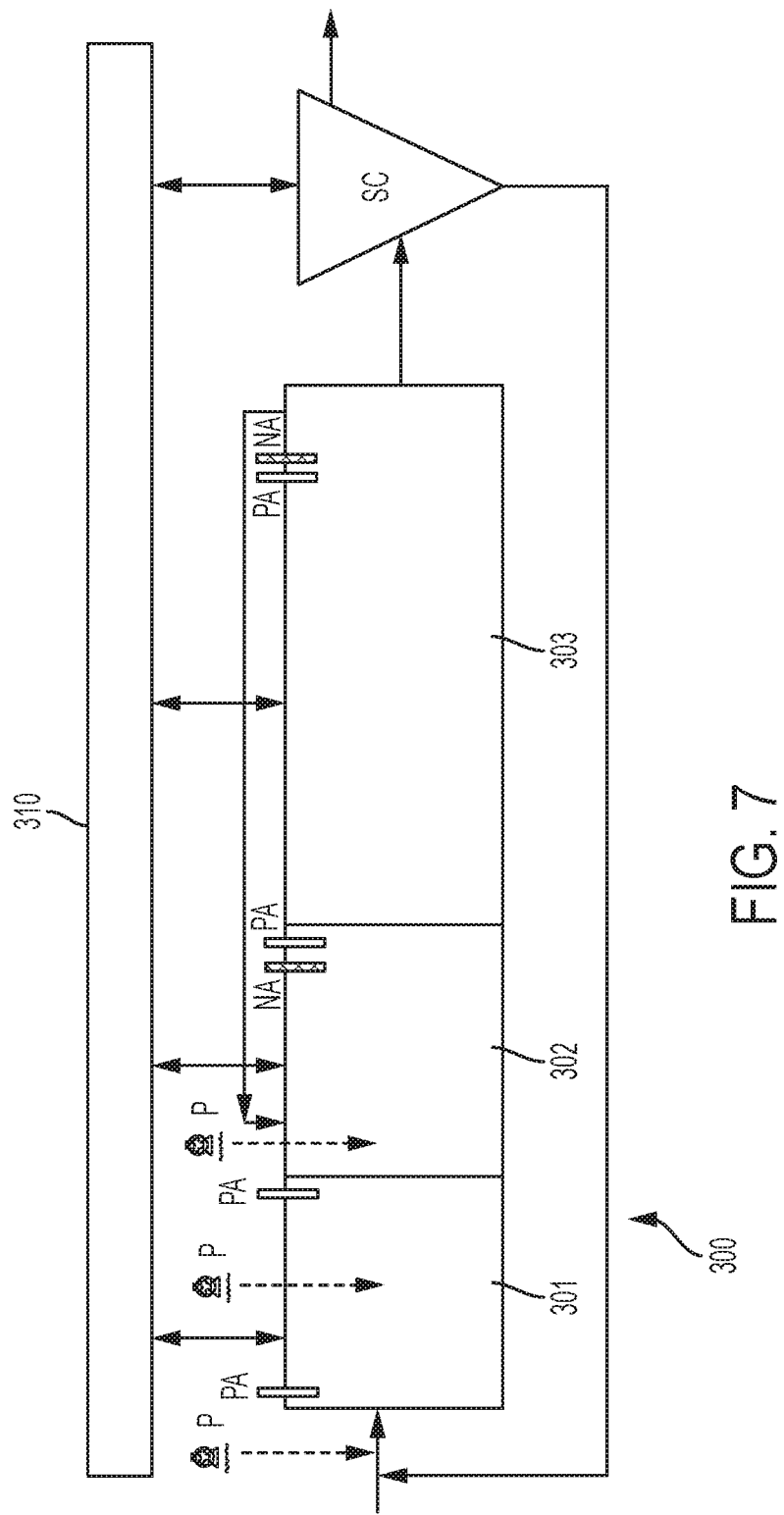
FIG. 7 is a schematic of the exemplary system for removing nitrogen and phosphorus from an activated sludge process known in the art as an A2O Process and discussed in Example 3.

In this embodiment, which is illustrated in FIG. 7, the centralized control system 310 removes nitrogen and phosphorus from an activated sludge process known in the art as an A2O Process. This process has three selectors in series (anaerobic 301, anoxic 302, aerobic 303), a nitrate recycle pump from the end of the aerobic selector to the beginning of the anoxic selector and a RAS return to the front end of the anaerobic selector.

The central control system 310 utilizes a plurality of sensors in the A2O process to accomplish the following. Control loop 1A doses a carbon source to the inlet of the anaerobic zone 301 to remove dissolved oxygen and NOX-N returned in the RAS and dissolved oxygen and NOX-N introduced in the influent flow. Control loop 2A doses the same or a different carbon source, in the same or different location in the anaerobic zone 301, to stimulate phosphorus release. The central controller 310 may also utilize a third control loop (Loop 1B) to dose the same or different carbon source for NOX-N removal in the anoxic zone 302.

The control loops are interrelated as follows. Control loop 1A is necessary to achieve anaerobic conditions such that EBPR can occur. Control loop 2A doses a carbon source to achieve phosphorus release in the anaerobic zone 301. In some embodiments, control loop 1A is the dominant control scheme until the NOX-N concentration is reduced to a certain level, i.e., approaching anaerobic conditions. Control loop 2A becomes the dominant control scheme when near complete denitrification is achieved. Control loops 1A and 2A can predict the amount of phosphorus uptake in the anoxic zone 302, using nitrate as the electron acceptor by DPAOs and phosphorus uptake in the aerobic zone 303 by ordinary PAOs based on the magnitude of phosphorus release in the anaerobic zone, the amount of carbon added in the anaerobic zone 301 and other inputs. Since the external carbon added to the anaerobic zone 301 for EBPR is internalized by the bacteria it is extremely difficult to measure the amount of carbon entering the anoxic zone 302 that may be available for denitrification. Thus, the information conveyed from control loops 1A and 2A is essential to optimize performance. Control loop 1B doses carbon for denitrification to the anoxic zone 302. Information from control loops 1A and 2A are used as an input to control loop 1B to dose the appropriate amount of carbon to achieve the desired magnitude of denitrification while conserving external chemical usage. Lastly, the denitrification performance in the anoxic zone 302 has a direct impact on the influent NOX-N concentration to the anaerobic zone 301 via the RAS. Therefore, a central controller improves operational efficiency.

Certain aspects of the system illustrated in FIG. 7 may be further summarized as follows:
Control Loop 1A: Denitrification in anaerobic zone 301.
Control Loop 2A: EBPR in anaerobic zone 301.
Control Loop 1B: Denitrification in anoxic zone 302.
Control Loop 1A, 1B
Inputs
  Flow Signals: Qinf, Qras, Qnrcy, Qother.
  Analyzer Signals: NOX-N, NO3, NO2, DO, ORP, others.
Outputs
  Signal to carbon dose pumps 1A and 1B for oxygen and NOX-N removal.
Control Loop 2A
Inputs
  Flow Signals: Qinf, Qras, Qnrcy, Qother.
  Analyzer Signals: P, PO4-P, NOX-N, NO3, NO2, DO, ORP, others.
Outputs
  Signal to carbon dose pump 2A for EBPR.
Loop 1 and Loop 2 Interrelatedness:
Loops 1A and 1B communicate to Loop 2A (nitrate removal performance or capability thereof impacts EBPR processes).

Loop 2A communicates to Loops 1A and 1B (carbon internalized as a result of Loop 2A impacts DO and NOX-N removal in selectors where Loop 1B is functioning).

Example 4: Denitrification and EBPR

Figure 8:
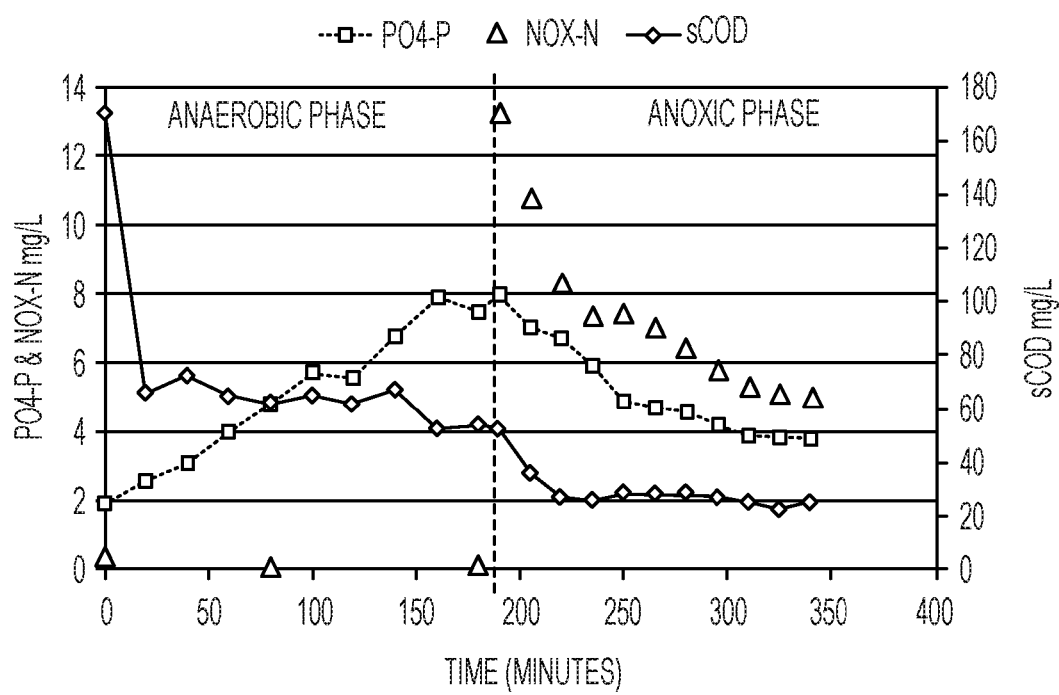
FIG. 8 is a plot of the concentration of each of PO4-P, NOX-N and sCOD over time, as further explained in Example 4.

The following example demonstrates the interrelationship of the EBPR, denitrification and carbon removal processes in a bench scale reactor. The bench scale reactor simulates an anaerobic selector followed by an anoxic selector. FIG. 8 is a plot of the concentration of each of PO4-P, NOX-N and sCOD over time. At the beginning of the anaerobic period at time zero there is no NOX-N present in the reactor and an external carbon source is dosed at a carbon to phosphorus ratio of 15:1. Note that the wastewater has residual soluble chemical oxygen demand (sCOD) at the beginning of the test. In the anaerobic phase NOX-N remains close to zero and phosphorus release from 2 to 8 mg/L and rapid sCOD removal (i.e. internalization) from 170 to approximately 60 mg/L are observed. At 180 minutes, nitrate is injected into the reactor converting the condition from anaerobic to anoxic. This simulates what occurs in a wastewater system where NOX-N is recycled from the end of an aerobic zone to the front of the anoxic zone in an A2O process. Following the introduction of nitrate, sCOD is reduced from approximately 50 mg/L to 25 mg/L. Phosphorus is taken up by DPAO's in the presence of nitrate and the absence of dissolved oxygen. The phosphorus is reduced from 8 mg/L to approximately 4 mg/L. Simultaneously NOX-N is reduced from approximately 13 mg/L to 5 mg/L. Furthermore, phosphorus uptake and denitrification continues to occur without a change in sCOD. In the EBPR mechanism, DPAO's oxidize PHA using oxygen from the nitrate molecule to generate energy and take up phosphorus. This process reduces NOX-N and PO4-P without utilizing sCOD in the anoxic selector.

In this example, a central controller is employed to measure the amount of phosphorus released in the anaerobic selector, measure how much carbon is consumed in the anaerobic selector and measure how much carbon is added to the anaerobic selector to predict the phosphorus uptake and NOX-N removal in the anoxic selector. The rate of denitrification and phosphorus uptake slows considerably at 300 minutes, indicating that PHA stores have been exhausted. The central controller can add external carbon at this point in time or in the process to completely denitrify the NOX-N.

An independent controller for the addition of a carbon source in the anoxic zone would not have the benefit of knowing the amount of NOX-N removal that would occur as a result of the DPAOs in the EBPR process. This would likely result in inaccurate dosing of external carbon. Likewise, an independent controller for the addition of a carbon source in the anaerobic zone for EBPR does not communicate the expected NOX-N removal to an independent denitrification controller. Therefore, a central controller executing carbon addition for both processes (EBPR and denitrification), in accordance with the present invention, is a more efficient method of performing nutrient removal and conserving chemical usage.

Figure 9:
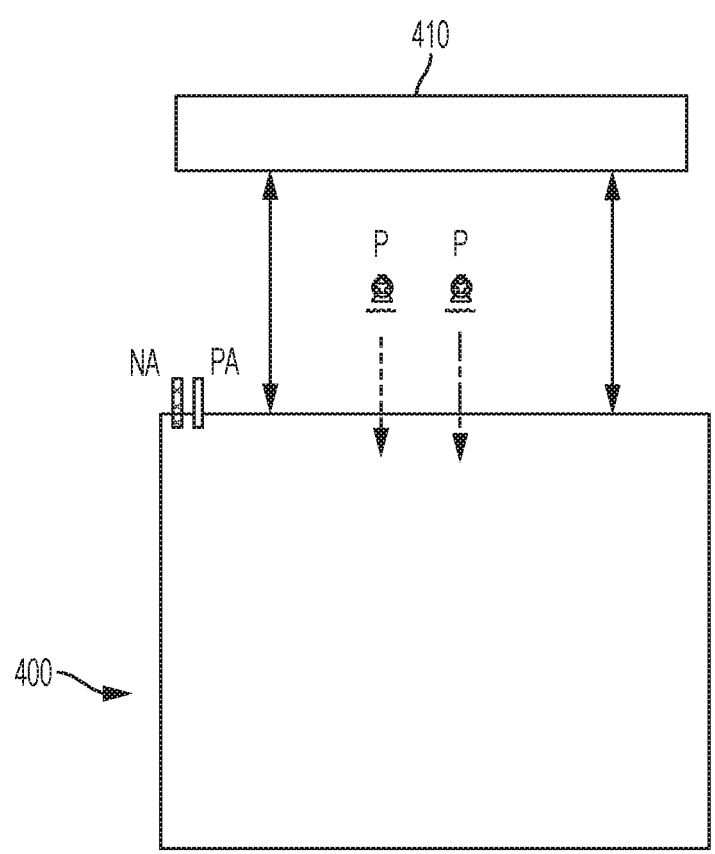
FIG. 9 illustrates a wastewater treatment process in which denitrification, EBPR and chemical phosphorus removal are carried out in a single vessel, as discussed in the Examples.

FIG. 9 illustrates a wastewater treatment process in which denitrification, EBPR and chemical phosphorus removal are carried out in a single vessel 400. In this embodiment, denitrification, chemical phosphorus removal and EBPR occur in the same vessel such as an SBR. Nitrate (NA), phosphorus (PA) and other analyzers monitor the condition of the tank as it proceeds through different operating cycles. The controller 410 can feed carbon for denitrification when NOX-N is present, feed carbon for EBPR with the same or different carbon source and can feed metal compound for chemical phosphorus removal. The controller works harmoniously to achieve the desired effluent N and P concentrations.

Figure 10:
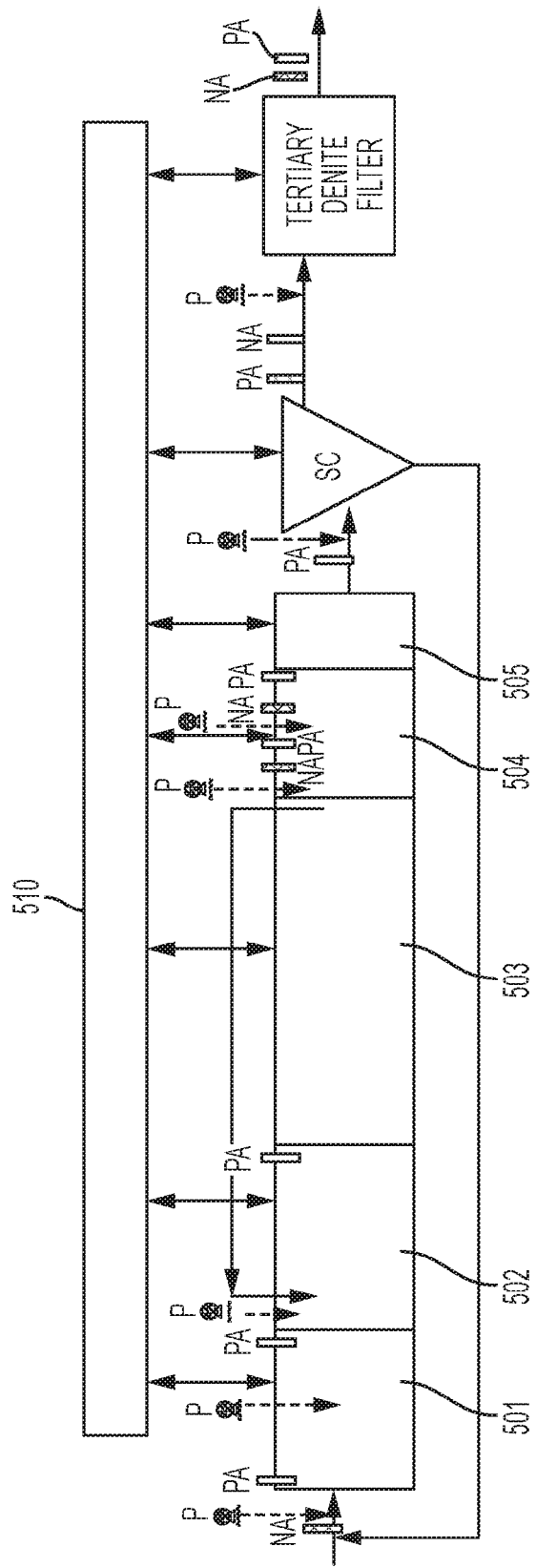
FIG. 10 is a schematic of an embodiment of the present invention discussed in the Examples, wherein a central controller is employed to accomplish denitrification, EBPR and chemical phosphorus removal.

Certain aspects of the process shown in FIG. 9 may be summarized as follows:
Control Loop 1A: Denitrification in the vessel.
Control Loop 2A: EBPR in the vessel.
Control Loop 3A: Metal compound for P removal in the vessel.
Control Loop 1A
Inputs
Flow Signals: Qinf, Qother.
Analyzer Signals: NOX-N, NO3, NO2, DO, ORP, others.
Outputs
Signal to carbon dose pump for oxygen and NOX-N removal.
Control Loop 2A
Inputs
Flow Signals: Qinf, Qother.
Analyzer Signals: P, PO4-P, NOX-N, NO3, NO2, DO, ORP, others.
Outputs
Signal to carbon dose pump for EBPR.
Control Loop 3A
Inputs
Flow Signals: Qinf, Qras, Qnrcy, Qother.
Analyzer Signals: NOX-N, P, PO4-P, pH, alkalinity others.
Outputs
Metal compound dose for P removal.
Loop 1 and Loop 2 Interrelatedness:
Loops 1A communicates to Loop 2A (nitrate removal performance or capability thereof impacts EBPR processes).
Loop 2A communicates to Loops 1A (carbon internalized as a result of Loop 2A impacts DO and NOX-N removal in the vessel.
Loop 2 and Loop 3 Interrelatedness:
Loop 2A communicates to Loop 3A (Loop 2A communicates EBPR performance to Loop 3A to adjust control strategy in Loop 3A to avoid over/under dose of metal compound).
Loop 3A communicates to Loop 2A (Loop 3A communicates chemical phosphorus removal performance to Loop 2A to adjust control strategy in Loop 2A to optimize biological phosphorus removal)
Loop 1 and Loop 3 Interrelatedness:
Loop 1A communicates to Loop 3A (Loops 1A and 3A communicate to maintain adequate N:P ratio to prevent P-limiting conditions;
Loop 3A communicates to Loop 1A (Loops 1A and 3A communicate to maintain adequate N:P ratio to prevent P-limiting conditions;

FIG. 10 is a schematic of a further embodiment of the present invention. In this embodiment, the central controller 510 is accomplishing denitrification, EBPR and chemical phosphorus removal. System 500 comprises an anaerobic zone 501, a pre-anoxic zone 502, an aerobic zone 503, a post-anoxic zone 504, a post-aeration zone 505, a settling tank SC, and a tertiary denitrification filter. Similar to the previous embodiments the various selectors are interrelated due to the process flow through the system and the various recycles in the system. Performance of carbon utilization, oxygen, nitrogen and phosphorus removal in one selector has a direct impact on the conditions and removal capabilities of other selectors in the process.

Certain aspects of the system shown in FIG. 10 may be summarized as follows:
Control Loop 1A: Denitrification in anaerobic zone 501.
Control Loop 2A: EBPR in anaerobic zone 501.
Control Loop 1B: Denitrification in pre-anoxic zone 502.
Control Loop 1C: Denitrification in post-anoxic zone 504.
Control Loop 2B: EBPR in post-anoxic zone 504.
Control Loop 3A: Metal compound to settling tank SC for P removal.
Control Loop 1D: Denitrification in tertiary process.
Control Loop 1
Inputs
 Flow Signals: Qinf, Qras, Qnrcy, Qother.
 Analyzer Signals: NOX-N, NO3, NO2, DO, ORP, others.
Outputs
 Signals to carbon dose pumps 1A, 1B, 1C and 1D for oxygen and NOX-N removal
Control Loop 2
Inputs
 Flow Signals: Qinf, Qras, Qnrcy, Qother.
 Analyzer Signals: P, PO4-P, NOX-N, NO3, NO2, DO, ORP, others.
Outputs
 Signals to carbon dose pumps 2A and 2B for EBPR.
Control Loop 3
Inputs
 Flow Signals: Qinf, Qras, Qnrcy, Qother.
 Analyzer Signals: NOX-N, P, PO4-P, pH, alkalinity others.
Outputs
 Signals to metal compound dose pump for phosphorus removal.
Loop 1 and Loop 2 Interrelatedness:
Loops 1A and 1B communicate to Loop 2A (nitrate removal performance or capability thereof impacts EBPR processes).
Loop 2A communicates to Loops 1A and 1B (carbon internalized as a result of Loop 2A impacts DO and NOX-N removal in selectors where Loop 1B is functioning).
Loop 1C communicates to Loops 1A and 1B (denitrification performance in the second anoxic zone impacts influent characteristics for Loops 1A and 1B).
Loop 1C communicates to Loop 2B (EBPR process in second anoxic zone is dependent on complete denitrification by Loop 1C).
Loops 2A and 2B communicate (EBPR loops communicate to moderate performance of each other, likely in a unidirectional manner).
Loop 2 and Loop 3 Interrelatedness:
Loop 2A and/or 2B communicates to Loop 3A (Loop 2A and/or 2B communicates EBPR performance to Loop 3A to adjust control strategy in Loop 3A to avoid over/under dose of metal compound).
Loop 3A communicates to Loops 2A and/or 2B (Loop 3A communicates chemical phosphorus removal performance to Loops 2A and/or 2B to adjust control strategy in Loops 2A and/or 2B to optimize biological phosphorus removal)
Loop 1 and Loop 3 Interrelatedness:
Loops 1A, 1B, 1C and/or 1D communicates to Loop 3A (Loops 1A, 1B, 1C and/or 1D and 3A communicate to maintain adequate N:P ratio to prevent P-limiting conditions; direction of communication is dependent on selector configuration and analyzer locations).
Loop 3A communicates to Loops 1A, 1B, 1C and/or 1D (Loops 1A, 1B, 1C and/or 1D and 3A communicate to maintain adequate N:P ratio to prevent P-limiting conditions; direction of communication is dependent on selector configuration and analyzer locations).

One skilled in the art will understand that the embodiments presented herein are non-limiting and the steps disclosed for one method may be used in another method. Furthermore, the order of the steps may be changed, or steps may be added or deleted without departing the scope of the present invention.

What is claimed is:

1. A method of removing at least one of nitrogen or phosphorus from wastewater, comprising:
 collecting data from a plurality of sensors, wherein each sensor measures at least one parameter in a selector of a wastewater treatment system;
 receiving the data from the plurality of sensors in a central controller, wherein the central controller comprises a plurality of control loops, wherein each control loop is adapted to control a single water treatment process in a selector and i) at least two of the control loops receive data from at least two common sensors coupled to different selectors of the wastewater treatment system and/or ii) at least one control loop receives data from at least one other control loop, wherein the data received from the plurality of sensors are utilized to determine a level of a liquid chemical compound required to adjust the level of nitrogen or phosphorus present in the wastewater to a preselected target level; and
 sending a control signal from the central controller to at least one liquid-chemical delivery system to dispense an amount of the chemical compound into the wastewater effective to achieve the preselected target level of nitrogen or phosphorus in the wastewater.

2. The method of claim 1, wherein one or more of said sensors measure one or more process parameters selected from the group consisting of influent flow rate, effluent flow rate, amount of chemical compound added into the wastewater, concentration of a substance within the wastewater, oxidation reduction potential of the wastewater, soluble chemical oxygen demand of the wastewater, intracellular carbon content, organic content of the wastewater, pH, alkalinity, and combinations thereof.

3. The method of claim 1, wherein one or more of said sensors measure the concentration of at least one substance in the wastewater selected from the group consisting of nitrate, nitrite, nitrous oxide, nitric oxide, dissolved oxygen, phosphorus, total phosphorus, orthophosphate and reactive phosphorus, and combinations thereof.

4. The method of claim 1, wherein said sensors are located in one or more locations within the wastewater treatment system.

5. The method of claim 1, wherein each water treatment process is selected from the group consisting of denitrification processes, enhanced biological phosphorus removal processes, and chemical phosphorus removal processes.

6. The method of claim 5, wherein at least one water treatment process is a denitrification process selected from the group consisting of denitrification in an anaerobic zone, denitrification in a pre-anoxic zone, denitrification in a post-anoxic zone, denitrification in a tertiary process, and combinations thereof.

7. The method of claim 5, wherein at least one water treatment process is an enhanced biological phosphorus removal process selected from the group consisting of enhanced biological phosphorus removal in which phosphorus release occurs in an anaerobic zone, enhanced biological phosphorus removal in which phosphorus release occurs in a post-anoxic zone, and combinations thereof.

8. The method of claim 1, wherein said liquid chemical compound is selected from the group consisting of methanol, acetate, propionate, carbohydrates, glycerol, hydrocarbons, alcohols and combinations thereof.

9. The method of claim 1, wherein said liquid chemical compound is selected from the group consisting of calcium and calcium salts, aluminum and aluminum salts, iron and iron salts, magnesium and magnesium salts, rare earth metals and rare earth metal salts, metal oxides, and combinations thereof.

10. The method of claim 1 wherein at least two of the control loops work in concert to achieve denitrification and biological phosphorus removal, in the same or different treatment vessel, by controlling two or more chemical metering pumps that inject the same or different carbon sources into the wastewater.

11. The method of claim 1, wherein at least two of the control loops work in concert to achieve denitrification without encouraging biological phosphorus removal.

12. The method of claim 1, wherein at least two of the control loops work in concert to achieve denitrification and chemical phosphorus removal, in the same or different treatment vessel, by controlling two or more chemical metering pumps that inject one or more of the same or different carbon sources and one or more of the same or different metal compound into the wastewater.

13. The method of claim 1, wherein at least two of the control loops work in concert to achieve biological phosphorus removal and chemical phosphorus removal, in the same or different treatment vessel, by controlling two or more chemical metering pumps that inject one or more of the same or different carbon sources and one or more of the same or different metal compound into the wastewater.

14. The method of claim 1, wherein at least two of the control loops work in concert to achieve denitrification, biological phosphorus removal and chemical phosphorus removal of the wastewater, in the same or different treatment vessel, by controlling two or more chemical metering pumps that inject one or more of the same or different carbon sources and one or more of the same or different metal compound into the wastewater.

15. The method of claim 1, wherein the central controller controls parallel wastewater process trains.

16. A water treatment system for removing at least one of nitrogen or phosphorus from wastewater comprising:
   a plurality of sensors, wherein each sensor is coupled to a selector of the water treatment system;
   at least one liquid-chemical delivery system for delivering to the wastewater at least one liquid chemical compound for removing nitrogen or phosphorus in the wastewater; and
   a central controller comprising a plurality of control loops,
   wherein each control loop is configured to control a denitrification process, a chemical phosphorus removal process, or an enhanced biological phosphorus removal process, and at least one of the following conditions are met:
   i) at least two of the control loops are adapted to receive signals from at least two common sensors coupled to different selectors of the water treatment system;
   ii) at least one control loop is adapted to receive a signal from another control loop for determining an amount of at least one liquid chemical compound to be dispensed into the wastewater to remove nitrogen or phosphorus in the wastewater.

* * * * *